United States Patent [19]

Stella

[11] 3,909,120
[45] Sept. 30, 1975

[54] ELECTROMAGNETIC AND ELECTROSTATIC RECORDING SHIELD

[75] Inventor: Joseph A. Stella, Peabody, Mass.

[73] Assignee: Polaroid Corporation, Cambridge, Mass.

[22] Filed: June 28, 1973

[21] Appl. No.: 374,503

[52] U.S. Cl. ................. 352/29; 352/72; 352/78 R; 360/3
[51] Int. Cl.² .......................................... G03B 31/02
[58] Field of Search............... 352/27, 29, 72, 78 R; 179/100.2 CA, 100.2 K, 100.2 Z; 360/3, 105, 130

[56] References Cited
UNITED STATES PATENTS

| | | | |
|---|---|---|---|
| 3,040,134 | 6/1962 | Berndt et al. | 352/30 X |
| 3,042,753 | 7/1962 | Iwamura | 179/100.2 C |
| 3,126,162 | 3/1964 | MacKenzie | 179/100.2 Z |
| 3,176,310 | 3/1965 | Finnerty | 352/72 X |
| 3,495,787 | 2/1970 | Wallace | 179/100.2 Z |
| 3,548,113 | 12/1970 | Thuber | 360/105 |
| 3,604,790 | 9/1971 | Land | 352/29 |
| 3,710,036 | 1/1973 | Kohtani | 179/100.2 MD |
| 3,712,552 | 1/1973 | Wada | 352/78 X |
| 3,751,042 | 1/1971 | Platt | 360/105 |
| 3,756,714 | 9/1973 | Caraway | 352/27 |
| 3,778,137 | 12/1973 | Castellano | 352/72 |

Primary Examiner—Monroe H. Hayes
Assistant Examiner—Alan Mathews
Attorney, Agent, or Firm—Michael Bard; John W. Ericson

[57] ABSTRACT

A photographic system for sound motion pictures, comprising a film cassette containing a strip of film, a supply of processing composition, and a processor programmed to apply the processing composition to the film upon manipulation of the film in the cassette and a film drive and projection system adapted to receive the cassette, and containing recording means to enable the recording of a sound track on the strip of film and the subsequent replaying of such recording. The recording means includes novel shielding means which extends at least partially over the cassette to ameliorate electromagnetic and electrostatic interference.

12 Claims, 21 Drawing Figures

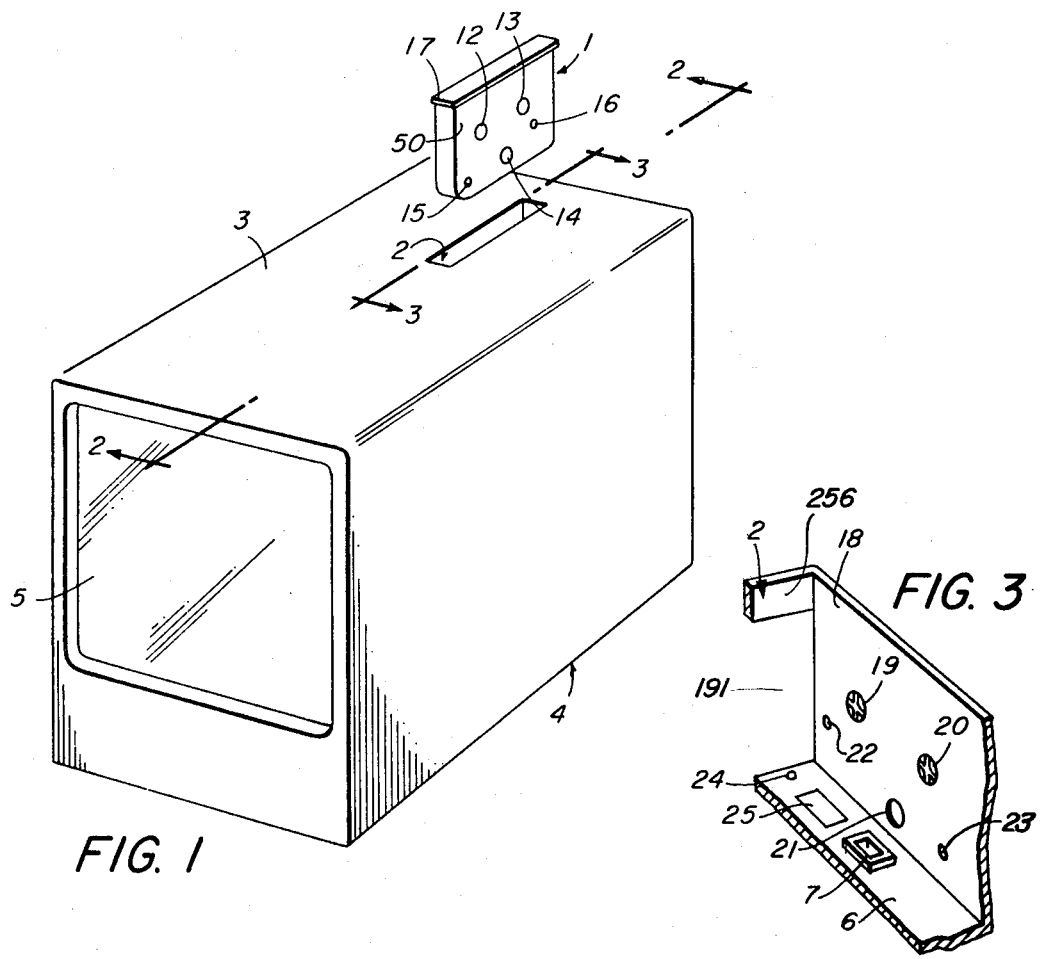
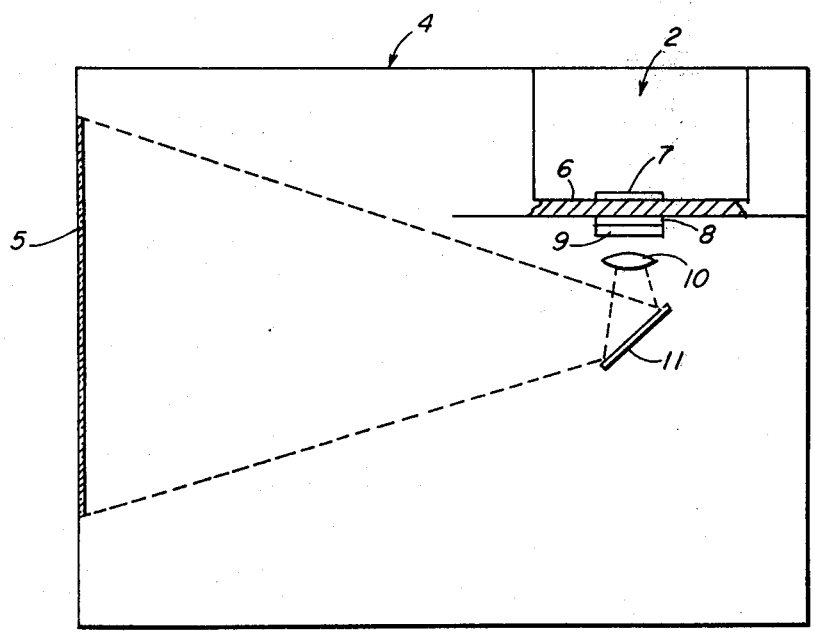

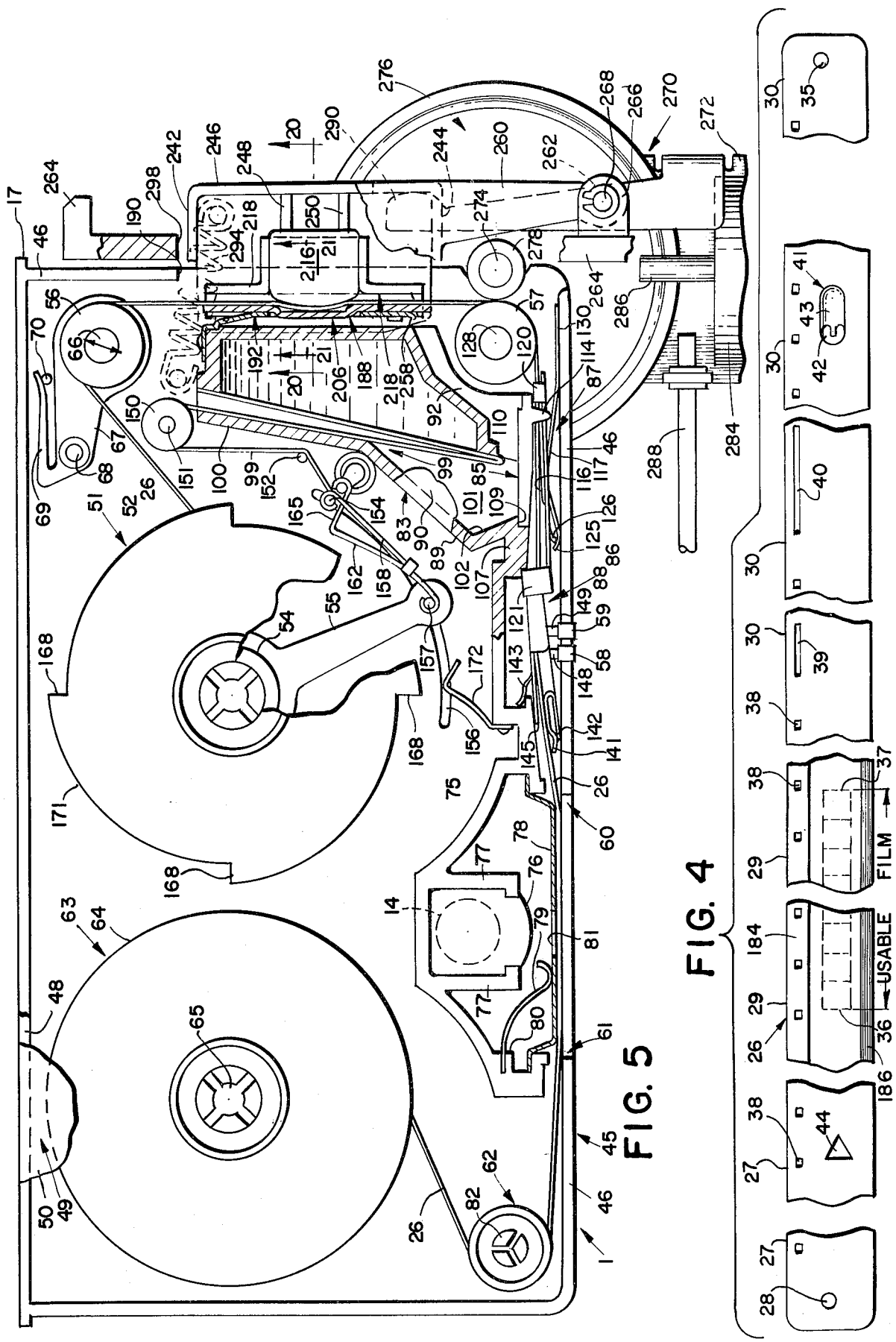

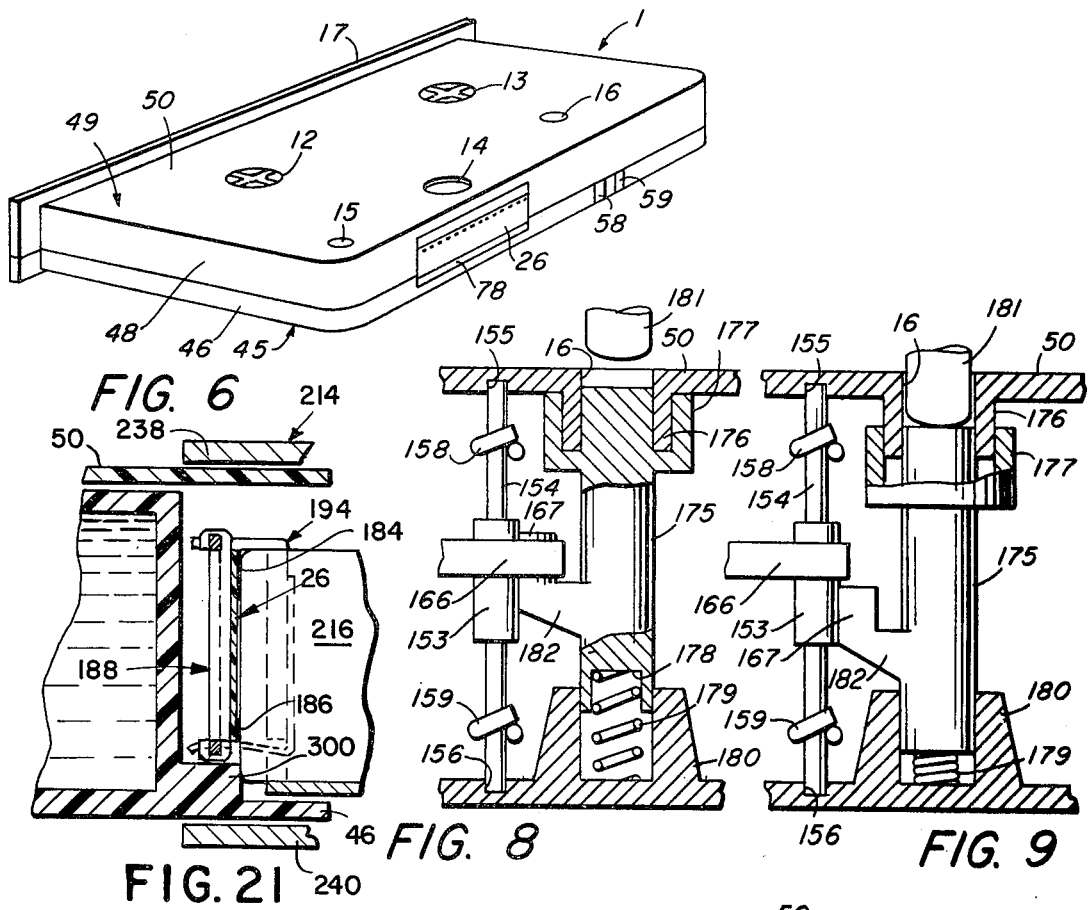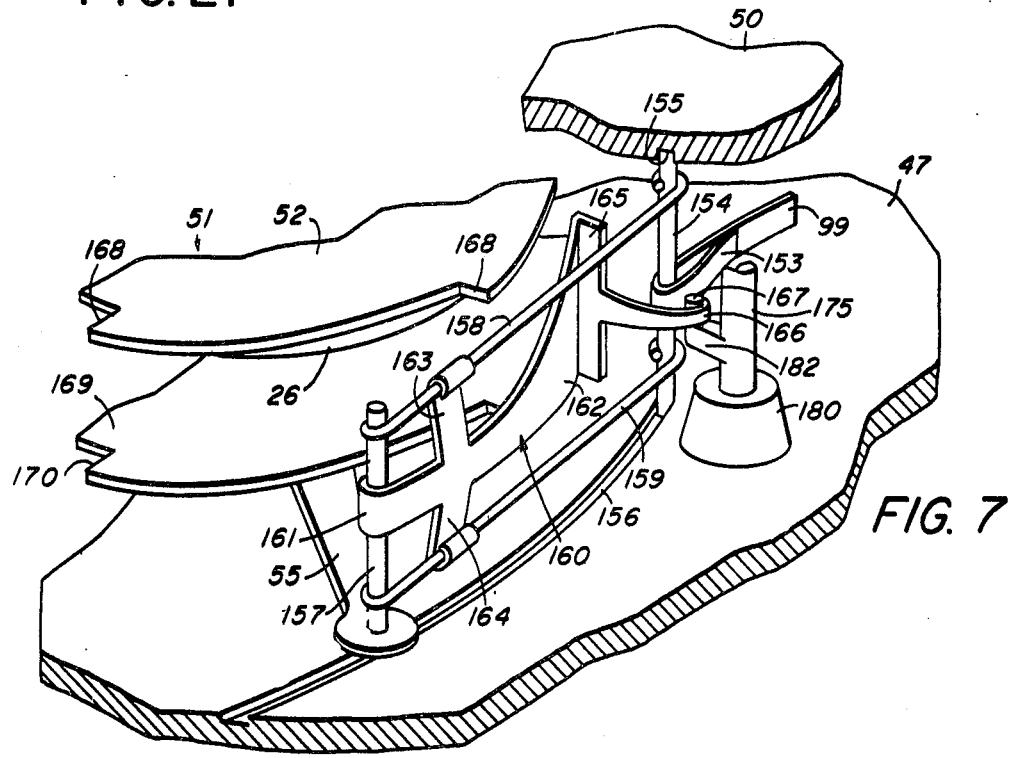

ELECTROMAGNETIC AND ELECTROSTATIC RECORDING SHIELD

This invention relates generally to motion picture photography and, more particularly, to a novel system for processing and projecting transparencies and making and playing back a sound recording integral with said transparencies whilst minimizing any electrostatic and electromagnetic interference.

BACKGROUND OF THE INVENTION

A widely accepted advance in the photographic art has been the creation of photographic systems in which photosensitive material is packaged with processing composition so that photographs may be produced without the aid of a dark room immediately after the production of a latent image in the camera.

More recently, this facility has been extended to the production of projection transparencies, as for motion pictures and the like, by a novel photographic system which is the subject of copending application Ser. No. 227,080, filed by E. H. Land, on Feb. 17, 1972, now abandoned. A replaceable film cassette comprises a key element of such novel photographic system and contains a strip of film, a supply of processing composition for the film, and an internally programmed processor responsive to the manipulation of the film in the cassette for applying the processing composition to the film after its exposure.

The cassette is adapted to be inserted in a camera for exposure of the film. After exposure, it is inserted into a film drive and projection system. This system comprises a receptacle configured to receive the cassette and cyclic drive apparatus for manipulating the film in the cassette. The film is manipulated in a sequence determined by a signal provided by the cassette that indicates whether or not the film has been processed.

In response to the insertion of a cassette containing unprocessed film, the film drive and projection apparatus manipulates the film in the cassette in a light-tight environment. That movement of the film activates the processor, developing the film to produce a series of fixed, visible, projectable images. Thereafter, the apparatus manipulates the film in an optical system, causing it to be projected for viewing. Finally, the film is wound for storage and subsequent reuse. In response to the insertion of a cassette containing the processed film, the system simply projects the film and then rewinds it.

Clearly, it is desirable to incorporate a sound recording and reproduction facility into such a photographic system as described hereinabove. However, an attempt to incorporate such a sound capability is presented with many obstacles not the least of which is the new and unique image recording medium employed in the above-described photographic system. For example, the film, as described in greater detail in U.S. Pat. No. 3,782,263, issued Jan. 1, 1974, and commonly assigned herewith, is thicker than conventional 8 mm. motion picture film and is further provided with side rails which further add to its thickness making it somewhat unsuitable for conventional sound recording and reproduction techniques. Additionally, processing fluid is applied to the surface of the film opposite that carrying the sound head as it is necessary that any mechanism used for supporting and/or guiding the film not interfere with the layer of processing fluid. Further, it is desirable to provide a mechanism to shield against undesired electromagnetic and electrostatic interference which would detract from sound quality.

Accordingly, it is an object of the present invention to facilitate the production of projection transparencies without the aid of a dark room whereby such images may be projected within minutes of their production in latent form and including provision for recording and playing back a sound track integral with said transparencies.

Another object of the present invention is to provide means for recording and reproducing sound in conjunction with a self-processing cassette of projection transparencies, and a cooperating mechanism for either projecting such transparencies or recording a latent image thereon wherein means are provided for shielding against undesired electrostatic and electromagnetic interference.

Still another object of the present invention resides in the provision of a shielded sound recording and reproducing mechanism for use with a self-processing cassette of motion picture film including support means for said film capable of guiding the movement of said film away from a prescribed path and capable of positioning said film with respect to a shielded sound reproducing and recording head whereby a clear audio signal may be recorded on said film or played back therefrom.

It is still a further object of the instant invention to provide a mechansim for the recording and playback of audio signals on motion picture film contained within a self-processing cassette of such film wherein a support is provided within said cassette for engaging and guiding the movement of such film and resiliently urging said film into engagement with a recording and reproducing head mounted in apparatus for receiving said cassette and projecting or recording images on said film with said head being so mounted as to guide the path of said film in a prescribed direction and with said head and said support cooperate to form a shield against undesired electrostatic and electromagnetic interference.

SUMMARY OF THE INVENTION

The above and other objects of the invention are attained by a novel photographic system which comprises as the key element a replaceable film cassette. The cassette comprises a lighttight housing containing a pair of storage reels on which a strip of film is disposed, extending from one reel to the other over a path including a film gate in the housing through which a portion of the film is exposed for cooperation with a camera, and with the film drive and projection system. The film is initially unexposed and coiled primarily about one of the reels, hereinafter referred to as the supply reel. The other reel, to be referred to as the take-up reel, is connected to one end of the film and adapted to store the film as it is advanced from the supply reel during exposure, or during subsequent manipulations in the film drive and projection system.

The cassette contains a processing system that is initially latched into an active state by a detent that is released when the cassette is inserted in the film drive and projection system. A singularity is provided on the film, preferably comprising a hook formed adjacent an aperture in the film near the end connected to the supply reel. In response to movement of the film toward the take-up reel beyond an exposure termination point established in the camera, the hook engages and releases a pressure pad that then resiliently urges the film into contact with a coating nozzle.

The film is provided, at least along one edge, with conventional sprocket holes to enable the film to be incrementally advanced onto the supply reel during exposure or projection. The series of sprocket holes is interrupted at a first point by a first elongated sprocket hole that serves to terminate the advance of the film in the camera. A second sprocket hole is provided, of greater length than the first, which serves a similar purpose in the film drive and projection system by terminating the advance of the film at a point beyond the exposure termination point established in the camera. When the film has been advanced in the film drive and projection system to the second termination point established by the second elongated sprocket hole, it is then rewound.

A pair of contacts on the cassette produce a signal, in the manner more fully described in application Ser. No. 227,080, aforesaid, that indicates whether or not the film has been processed. This signal is sensed by the film drive and projection system when the cassette is inserted into it. If the film has not been processed, rewinding takes place in three stages. As the first step, a short length of film is drawn onto the supply reel, causing rotation of the supply reel in the rewind sense for the first time since the manufacture of the cassette. Rotation of the supply reel in that sense activates a release mechanism enabled by the inserttion of a film cassette in the film drive of a projection system to release the processing composition in preparation for developing the film.

A short interval of time is then allowed to elapse during which the film is motionless. That allows the processing composition to find its way into the coating nozzle. Thereafter, the film is rewound onto the supply reel continuously at constant linear speed relative to the coating nozzle while the processing composition is applied to it in a thin, uniform coat. Towards the end of this process, as the film nears its end on the take-up reel, another singularity in the film which may take the form of an aperture in the film near the end connected to the take-up reel engages the processor and causes the pressure plate to be cammed out of engagement with the film and into a latched storage position while closing the coating nozzle aperture.

The film drive and projection system includes a drive mechanism coupled to the supply and take-up reels through slip clutches. As the end of the film is reached on the take-up reel, these shafts slip and the cessation of motion is sensed to cause the drive system to advance to a projection mode of operation.

In that mode, a snubber reel in the cassette is engaged to prevent motion of the film onto the take-up reel except as it is incrementally advance by a drive pawl that sequentially engages the sprockets in the edge of the film. A projection lamp is turned on that directs light through the film to a lens that focuses an image of the developed images onto a screen provided as part of the projection system. The finished film is thus projected for viewing within approximately a minute after the insertion of the exposed film into the film drive and projection system.

The film contains a pair of side rails which extend along its opposite edges at least one of which includes a mangetic sound track capable of receiving and storing audio signals for subsequent reproduction. When it is desired to record audio signals on the magnetic sound track, as at the start of the projection cycle in the film drive and projection system, a sound recording and reproducing head operably disposed within the film drive and projection system is moved into a predetermined position with respect to one end of the cassette in a manner more fully described in copending application Ser. No. 374,578, filed June 28, 1973, by Donald T. Scholz, and commonly assigned herewith. The sound reproducing and recording head is prevented from moving further toward the film from its predetermined position by means of a stop integral with the cassette. A support is resiliently secured within the cassette initially out of engagement with the film.

The support is cantilevered within the cassette and is biased toward engagement with the film strip. As indicated above, however, the support is not in engagement with the film until the sound reproducing and recording head is moved from an idle position to its operative position.

The resilient support is configured to define a pair of spaced, raised support strips which engage the edge portions of the coated surface of the film and define a channel to allow the film strip with its wet coating of processing composition to pass thereover.

When the sound recording and reproducing head is moved into its operative position, the film strip will be sandwiched between the head and the resilient support and the raised support strip beneath the sound track will urge same into engagement with a transducer carried by said head.

The head is equipped with guide means secured to the transducer and which is adapted to encompass the film strip and engage the opposite edges thereof when said head is in the operative position. The guide means is adapted to further encompass the resilient support and together therewith functions to guide the film along a prescribed path. Thus, it can be seen that the guide means and the resilient support will cooperate to initially register the transducer with respect to the film strip and its sound track and further cooperate to maintain such registration.

The magnetic recording and playback head is configured to define a housing which extends over five sides of the transducer which is of a standard six-sided configuration.

The resilient support is located proximate an aperture in an end wall of the cassette and cooperates with the head housing to cover the remaining open side of the transducer. When the head is moved into its operative position, the transducer is received partially within the aperture in the cassette and the guide means engages the resilient support. The five-sided housing is now proximate the resilient support and two sides of said housing extend over opposite lateral faces of the cassette beyond the plane of the resilient support. The five-sided housing and the resilient support are constructed of a material of high permeability such as Mu-metal and, thus, when the head is in its operative position, an electromagnetic and electrostatic shield encompasses the transducer and the small portion of the sound track in abutment therewith.

While the sound recording and reproducing head is in engagement with the magnetic sound track, a desired narrative may be impressed on such magnetic sound track for subsequent reproduction during the next projection cycle of the film drive and projection system and such narrative will be relatively free of distortion otherwise due to electromagnetic or electrostatic interference.

It should be noted at this point that the sound recording and reproducing head may be mounted within the camera rather than the film drive and projection system and that it will cooperate with the resilient supporting member within the cassette in the same manner as when said recording and reproducing head is positioned with the film drive and projection system.

At the end of the projection cycle, the film is rapidly rewound onto the supply reel. The cassette, which may now include a narrative impressed on the magnetic sound track of the film, is then automatically ejected.

In the event that the film in the cassette has been processed prior to its last insertion into the system (and a narrative impressed on the magnetic sound track), operation would commence with the projection of the film and reproduction of the narrative and conclude by rewinding the projected film onto the supply reel and ejecting the cassette as before.

DESCRIPTION OF THE DRAWINGS

The subject invention will be better appreciated and said invention will become more clearly understood by reference to the following detailed description when considered in conjunction with the accompanying drawings illustrating one embodiment of the subject invention, wherein:

FIG. 1 provides a schematic perspective of a film cassette shown in association with a film drive and projection system in accordance with the invention;

FIG. 2 provides a simplified elevation with parts shown in cross-section and parts broken away of the film drive and projection system of FIG. 1 taken substantially along line 2—2 in FIG. 1;

FIG. 3 provides a fragmentary perspective of a portion of a cassette receiving receptacle in the film drive and projection system of FIG. 1 taken substantially along the lines 3—3 in FIG. 1;

FIG. 4 is a fragmentary schematic plan (partially broken away) of a film strip forming a part of the cassette of FIG. 1;

FIG. 5 is a simplified schematic plan, partly in section and partly broken away, of a film cassette in accordance with the invention illustrating a magnetic recording and playback head and cooperating support plate in operative position;

FIG. 6 is a simplified perspective of a cassette according to the subject invention;

FIG. 7 provides a fragmentary perspective, partially broken away and partially in cross-section, of a portion of a composition release mechanism forming a part of the apparatus of FIG. 5;

FIGS. 8 and 9 are simplified fragmentary cross-sectional elevations, partly broken away, of further details of a portion of the release mechanism of FIGS. 5 and 7, taken substantially along the lines 8—8 in FIG. 5 with parts shown from positions taken somewhat behind those lines, showing the parts in two positions and in association with a portion of a detent release mechanism forming a part of the film drive and projection system of FIG. 1;

FIG. 21 provides a simplified cross-sectional view taken along lines 21—21 of FIG. 5.

Figure 10:
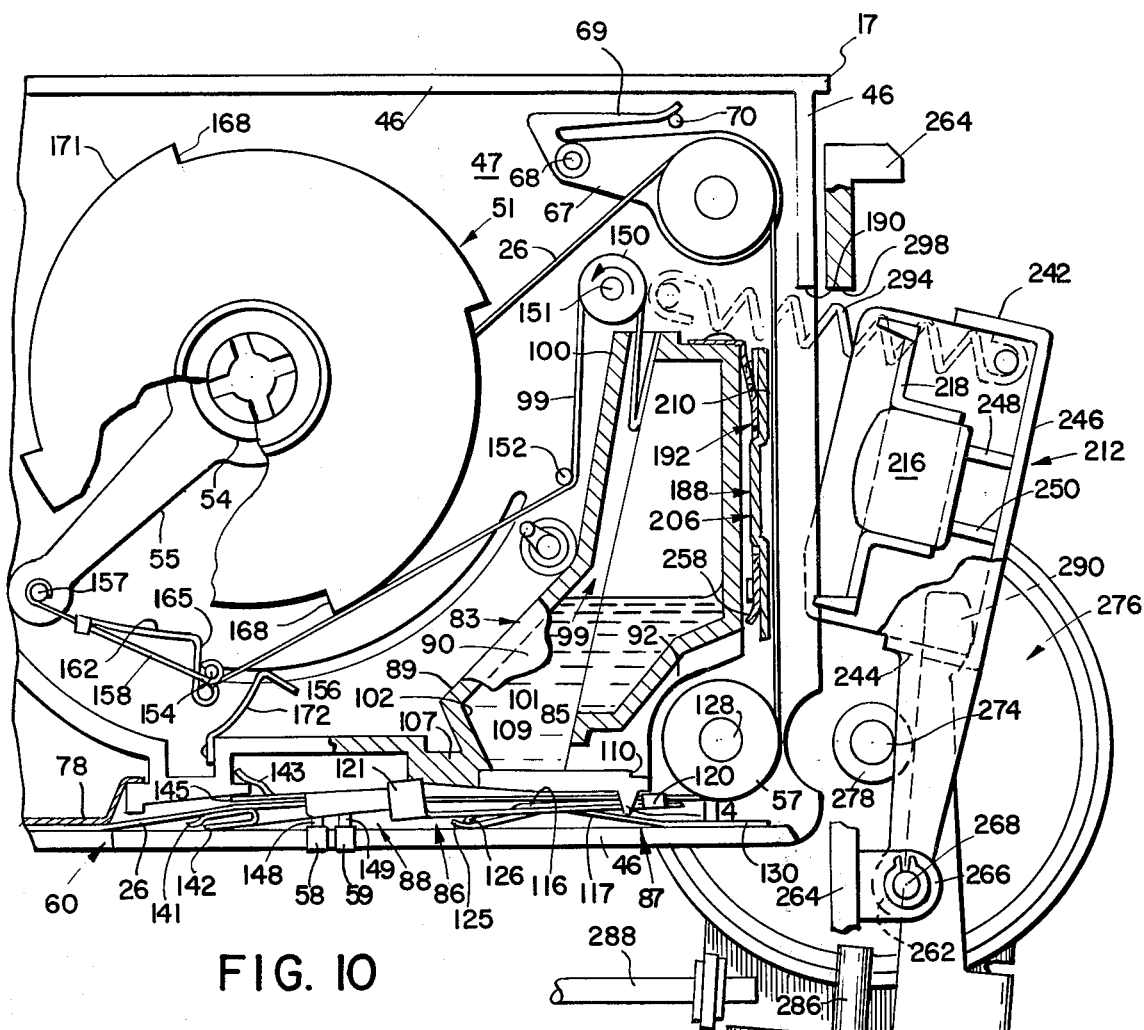
FIG. 10 is a simplified fragmentary plan, partly in section and partly broken away, showing the apparatus of FIG. 5 in another position assumed during its operation with the magnetic recording and playback head in the idle or disengaged position.

Referring to the drawings in more detail and, more particularly to FIG. 1, the system of the invention is illustrated in its external cooperative aspects. The basic elements of this system are a film-laden cassette 1 adapted to be inserted in a pocket 2 formed in the outer housing 3 of a film drive and projection system generally designated 4. A translucent viewing screen 5 on which projected images at times appear is mounted at the front end of the housing 3.

As best seen in FIG. 2, the pocket 2 has a floor 6 on which an aperture plate 7 is mounted. The aperture plate 7 is adapted to extend into the cassette 1 and there register with the film in the cassette. Light supplied passes through the film and thence over a path traversing a suitable framing aperture in the aperture plate 7, a cooperating recess in the floor 6, a blinder housing 8, and a conventional shutter 9 to a lens 10. The lens focuses an image of the portion of the film selected by the framing aperture on a mirror 11 from whence it is reflected to the screen 5.

As best illustrated in FIG. 1, the cassette 1 is provided with a number of light-baffled openings 12, 13, 14, 15, and 16. These openings expose parts adapted to cooperate with corresponding parts of the film drive and projection system to perform various functions in the cassette. Thus, a sprocket formed on the take-up reel is accessible through the opening 12. A similar drive sprocket formed on the supply reel is accessible through the opening 13. Projection light is at times admitted to the cassette through the opening 14. A stop can enter, to brake a snub roll forming a part of the cassette, through the opening 15. The opening 16 serves to admit a locating pin, forming a part of the film drive and projection system, to register the presence of a cassette in the system and to enable the processing apparatus in a manner to be described.

A flange 17 is formed on the upper end of the cassette 1. This flange aids in grasping the cassette while inserting it in or removing it from the packet 2. It also helps to fix the cassette in position in the film drive and projection system by engagement with the rim of the pocket 2.

As best seen in FIG. 3, parts adapted to enter the openings in the cassette 1 are adapted to enter the pocket 2 through corresponding openings in a side wall 18 of the pocket. Drive sprockets for the supply and take-up reels are adapted to enter through the openings 19 and 20, respectively. A light beam for projection enters through an opening 21. The locating pin enters through an opening 22 and the snubber roll stop enters through an opening 23.

In addition to the aperture plate described above, the actuating arm 24 of a normally closed switch (not shown) is movably mounted on the floor plate 6. The switch is adapted to be open when a cassette is inserted in the pocket 2, for purposes to appear.

A foot pedal 25 is movably mounted in the pocket 2 to be depressed by the insertion of a cassette and is connected to an actuating arm extending through the floor plate 6, as will be described.

The photographic system of the invention preferably makes use of a photo-finishing process in which a strip of film, following exposure in the camera, is contacted with a single processing composition to form a finished transparency from the latent image or images formed on the film during its exposure. Referring to FIG. 4 in more detail, there is shown a film strip generally designated 26 which comprises a leader 27 terminating in an end formed with an aperture such as 28. The aperture 28 serves to connect that end of the film to a take-up reel to be described. Behind the leader, which may typically be on the order of 18 inches in length, there is s strip 29 of photographically useful film upon which projection images may be formed. The strip 29 may be, for example, approximately 52 feet in length of 8 mm. film.

Following the photographically useful portion of the film is a trailer region designated 30. The trailer 30 terminates at another end formed with an aperture 35 by means of which that end of the film is adapted to be connected to a supply reel to be described.

The film 26 may comprise a base of any suitable transparent material of the kind conventionally used for film bases. On this base is applied, at least over the central portion of the photographically useable length of the film 29, an emulsion comprising a photosensitive coating wherein a series of latent images illustrated by a series extending from a first frame 36 to a last frame 37 may be formed with a camera. The photosensitive coating is preferably of one of the forms, next to be described, which can subsequently be processed to form a projectable image on the film base.

Photosensitive coatings useable in the practice of the invention may be of any conventional variety adapted to be developed by a monobath processing composition to form a positive transparency suitable for projection. In particular, a currently preferred embodiment of the invention makes use of a film structure which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer reversal processes for the rejection of black and white images, a silver halide developer in a silver halide solvent are applied in an aqueous alkaline solution to a photoexposed silver halide emulsion stratum, where they develop exposed silver halide to silver, and react with unreduced silver halide to form soluble silver complex. This complex, in order to form a positive print, is transferred and reduced to silver on a silver-receptive stratum upon which the silver halide stratum has been superposed.

In one practice in the completion of this process, the silver-receptive and silver halide strata have been separated in order to render the positive print visible. However, as indicated above, the positive print may be rendered visible without separation of the silver halide and the silver-receptive strata. For example, the silver-receptive stratum may be so constructed as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in superposition provide a composite print that represents a good image for projection purposes so long as they are contained along a transparent support. Since the silver halide stratum and the silver-receptive stratum need not be separated, an overall simplification of the silver transfer reversal is achieved.

A composite film assembly of this type, as well as processing compositions for producing a fully developed black and white without the necessity of removing the developed negative image after processing, are shown in prior U.S. Pat. No. 2,861,885, issued to E. H. Land on Nov. 25, 1968, for Photographic Processes and Products. Other composite film assemblies capable of producing developed full color images without the necessity of removing the developed emulsion are shown in prior U.S. Pat. of E. H. Land, No. 2,726,154, issued Dec. 6, 1955, for Photographic Product; and No. 2,944,894, issued July 12, 1960, for Photographic Processes Utilizing Screen Members.

It should be noted that the invention is not directed to the chemistry by which images are developed in a photosensitive emulsion and transferred to an image-receiving stratum. However, in the practice of the invention, whether the film employed is black and white or color film at the present time the preferred embodiment of the invention employs film of a type not requiring the removal of a negative emulsion after it is developed.

Referring again to FIG. 4, the film 26 is formed along one edge with sprocket holes such as 38 at regular intervals adapted to cooperate with a drive pawl, in either the camera or the projector, for incremental advancement of the film. The series of sprocket holes 38 adjacent the trailing end 30 of the film may be interrupted by a first elongated sprocket hole 39. This elongated hole 39 may span, for example, two of the sprocket holes 38.

Further along the film in the direction of the supply reel end, the series of sprocket holes 38 is again interrupted by a second elongated sprocket hole 40 longer than the sprocket hole 39 and, for example, spanning three of the sprocket holes 38. As will appear, the first elongated sprocket hole 39 establishes an exposure end point in the camera, whereas the second elongated sprocket hole 40 determines a film take-up termination point in the film drive and projection apparatus to be described.

Basically, termination of film advance at the first elongated sprocket hole 39 is attained by the use of a single drive pawl in the camera which sequentially engages the sprocket holes 38 to advance the film by one frame length in a conventional manner. Toward the end of such advance stroke, as is conventional, the pawl is cammed down out of engagement with the film. When the single pawl engages the elongated aperture 39, the camming down movement occurs before the film engages the leading edge of the elongated hole; and, therefor, the pawl may cycle repeatedly without further advance of the film. This serves to effect a termination of film advance for the purpose of exposure adjacent the end of the region of photographically useable emulsion to alert the photographer, by the somewhat different sound produced when the pawl skips the film, that his cassette should be replaced.

The film drive and projection system is provided with a double pawl comprising two integral pawls spaced apart by one frame length, each pawl being of the same shape as the singular pawl in the camera. When the first elongated aperture 39 is encountered, the leading pawl of the pair serves to engage the leading edge of the aperture 39 to cause the film to be advanced without interruption. For normally spaced sprocket holes 38, both of the pawls engage the film in sequential sprocket holes. However, when the second elongated sprocket hole 40 is encountered, the pawls will pass through it without film engagement and thereby terminate the film advance in the same manner as did the single pawl upon engagement of the double length sprocket hole 39.

Formed on the trailing end 30 of the film 26 (beyond the exposure advance termination point just described in the direction of the supply reel end of the film 26) is a singularity generally designated 41 comprising a detent engaging element here shown as an aperture 42 formed in the film adjacent which a projecting bump 43 is formed as by pressure, heat and pressure, or the like. The singularity 41 thus comprises a hook adapted to engage a detent in the form of a process control actuating element as the film is moved with respect to the detent in the direction of the take-up reel.

The bump 43 forming a part of the detent engaging assembly 41 in FIG. 4 projects from the film and might be deformed or might cause pressure marks on other parts of the film as it is wound on the reel. To avoid this result, it is preferred to provide suitable pockets, not shown, comprising apertures formed in the trailing end 30 of the film and spaced at suitable intervals with respect to the radius of the supply reel spool to receive the projection 43 as the film is wound onto the reel. This provision allows the film to be evenly wound on the spool without deformation of the bump.

Formed on the leader end 27 of the film 26 is another detent engaging means, here shown as an aperture 44 in the central region of the film. This aperture serves to actuate a valve member, forming a part of the processing apparatus to be described, for purposes to appear.

Referring again to FIG. 5, the cassette 1 is seen to include a housing formed of any suitable opaque material and is preferably manufactured in two cooperating parts.

As best seen in FIGS. 5 and 6, the housing parts comprise a base generally designated 45, comprising side walls 46 and a base plate 47. The base plate 47 extends across the base of the walls 46 and comprises one side of the housing. The walls 46 extend at least in part about the periphery of the base 47 and cooperate with integral walls 48 of a cover generally designated 49. The walls 48 overlap the corresponding segments of the walls 46 to form of the housing of the cassette 1.

A cover plate 50 is formed integral with the walls 48 and completes the upper side of the housing as seen in FIG. 6. The terms "base", "cover", "upper", and "lower" are relative and are adapted simply for conveenience. Similarly, the selection of the parting lines between the walls 46 and 48 is a matter of convenience. In particular, the choice is preferably so made that the base 45 can serve as a support upon which all of the additional fixed and moving parts to be described may be assembled before the cover 49 is put in place.

When the cover 49 is placed in position, it may be formed integral with the base 45 by heat sealing or by a suitable adhesive or the like. The base and cover parts form, when assembled, the end flange 17 that serves to support and locate the cassette 1 in either a camera or in the film drive and projection system of FIG. 1.

Rotatably disposed within the cassette housing is a supply reel designated 51. The reel 51 is provided with an upper flange 52 and a corresponding lower flange (not illustrated in FIG. 5) to guide the film strip 26 as it is wound about the spool portion of the roll 51, not shown, to which the supply end 30 of the film 26 (FIG. 4) is attached.

A sprocket schematically indicated at 53 may be formed integral with the reel 51 to adapt the reel to be driven about its axis of rotation. Access to the sprocket 53 may be provided through the aperture 13 in the cover plate 50 (FIG. 1), light-baffled by suitable conventional annular flanges (not shown) formed in cooperating relation on the cover plate 50 and on the upper surface of the flange 52 (FIG. 5). The lower flange of the reel 51 may be formed in a conventional manner with a cylindrical axial opening to receive a cooperating axle (not shown) formed integral with the base plate 47.

A hub 54, formed integral with the base plate 47, serves as a bearing for an arm 55 that is rotatable in the housing about the axis of the reel 51. The arm 55 forms part of the composition release mechanism, to be described.

Initially, the film 26 is in its unexposed state and coiled primarily about the supply reel 51. It is shown in FIG. 5 in the position assumed as it nears the end of its movement away from the supply reel 51, as toward the end of an exposure in a camera, in which it is nearly exhausted from the reel 51.

In its path from the supply reel 51, the film 26 first encounters a bobulator roll 56. The film engages a portion of the periphery of the bobulator roll, as shown, and passes therefrom through a magnetic recording mechanism, to be described, and around a conventional idler roll 57, journalled for rotation in the housing, and thence through film processing means, to be described infra.

In addition to the apparatus for processing the film in a manner to be described, the film processing means comprises a signal generated for producing an external condition signal on terminals schematically indicated at 58 and 59 to indicate whether or not the processing means has been actuated.

Beyond its path through the film processing means, the film 26 extends through a conventional light-baffled aperture schematically indicated at 60 and forming a portion of a film gate in the housing. The film 26 reenters the housing through a second light-baffled aperture generally indicated at 61 and comprising a second portion of the film gate.

The film 26 next passes over a conventional snubber roll generally designated at 62 and finally passes to a take-up reel 63 comprising a spool portion to which the take-up reel end of the film is connected and about which the film is wound as suggested in FIG. 5.

In addition to parts corresponding to those parts described in connection with the supply reel 51, the take-up reel comprises an external upper flange 64 protruding beyond the maximum radius of the film 26 when substantially stored on the take-up reel. On the flange 64 is formed a suitable drive sprocket 65 by means of which the film may be selectively advanced in a manner to be described.

The bobulator roll 56 may be of any conventional construction suitable for the performance of the known function of isolating the film drive pawl associated with the camera or the pawl associated with the projector from the inertia of the supply reel 51. However, it is preferably of the form shown in which the bobulator roll 56 is journalled on a pin 66 for rotation by the film.

The pin 66 is formed integral with a support 67 of plastic or the like. The support 67 is journalled to the base plate 47 by means of a pin 68, formed integral with the base plate, and is biased by a spring 69 which is formed integral with the supoport 67. The spring 69 acts against a post 70 formed integral with the base plate 47. The bobulator roll 56 can thus both rotate about the pin 66 and move backward and forward in the direction of the double arrow shown in FIG. 5.

The bobulator roll 56 responds to increases or decreases in the tension of the film 26 by temporarily shortening or lengthening the film path. Such changes in film tension are produced by the actuation of the film drive pawl and are determined by the inertial forces exerted by the supply reel 51 together with the larger or smaller supply of film that may be on it at any given time. By that arrangement, as the film is incrementally advanced by the pawl associated with the camera or the projector, it can rapidly move the bobulator roll 56 against the spring 69 without immediately effecting the supply reel 51 which can then more or less gradually allow the bobulator roll to relax while supplying the segment of the film taken by the pawl.

A lighttight shield around the film gate formed by the apertures 60 and 61 is formed by a wall portion 75 formed integral with the base plate 47 and made integral with the cover plate 50 after assembly of the parts in the manner described above. A chamber behind the film 26 is thus formed for the purpose of admitting projection light.

The apparatus for this purpose is conventional and will only be described briefly. In short, it comprises a prism generally designated 76 and comprising a mirror, not shown, but disposed at 45 degrees to the plane of FIG. 5. As schematically indicated, the prism 76 is mounted betwen extensions 77 formed on the wall 75.

Light enters the cassette through the port 14 formed on the cover plate 50 (FIG. 6) in directions normal to the plane of FIG. 5. The mirror in the prism 76 directs this light downwardly through the film 26 in the film gate for the projection of images on the film through the lens 10 (FIG. 2).

Also disposed in the chamber bounded by the wall member 75 and the film passing through the film gate is a conventional pressure plate 78 located between the prism and the film and biased by a spring 79 into engagement with the film. The spring 79 is supported by extensions 80 of suitable shape integral with the wall 75, as shown.

The pressure plate 78 serves in the conventional manner to cooperate with a camera be locating the focal plane of the film during exposure. An aperture 81 is provided in the pressure plate 78, as schematically indicated, to pass light entering through the prism assembly 76 and through a selected frame of the film 26 after the film is processed in a manner to be described. It is preferred that the aperture 81 be somewhat larger than the frame to be projected so that the aperture in the aperture plate 7 (FIGS. 2 and 3) serves as the limiting aperture bounding the projected frame.

The snubber roll 62 may also be of entirely conventional construction. As illustrated, it is provided with a hub portion schematically indicated at 82 that is adapted to protrude through the (suitably light-baffled) aperture 15 in the cover panel 50 for engagement by a stop member comprising a part of either the camera or of the film drive and projection system that is engaged when the film is to be incrementally advanced by a pawl for exposure or projection purposes. The cooperation between the snubber roll 62 and the take-up reel 63 is conventional, but will be briefly described.

the drive sprockets 53 and 65 of the supply and take-up reels 51 and 63, respectively, are adapted to be engaged by corresponding drive sprockets comprising a part of the camera or of the film drive and projection apparatus to be described. In the film drive and projection apparatus, both the supply and take-up reels are adapted to be driven through slip clutches. In the camera, drive for the take-up reel need be provided. This drive comprises a slip clutch connected to a sprocket driving the take-up reel drive sprocket 65 in cooperation with a drive pawl for sequentially engaging a series of the sprocket holes 38 formed in the film 26 along a portion of the edge of the film in the film gate between the apertures 60 and 61.

When the snubber roll 62 is stopped by engagement of the hub 82 as described above, operation of either the camera or of the film drive and projection system to incrementally advance the film toward the take-up reel 63, by engagement of a pawl with the sprocket holes in the film 26, will momentarily loosen the film from engagement with the stationary snubber roll 62 and allow the slip clutch driving the take-up reel 63 to take up that increment of the film advanced by the pawl. Between engagements of the pawl, the slip clutch prevents the take-up reel from advancing the film.

In the film drive and projection system to be described, the snubber roll 62 is engaged only while the film is to be incrementally advanced onto the take-up reel. When the film is rewound onto the supply reel, the snubber roll 62 is engaged only while the film is to be incrementally advanced onto the take-up reel. When the film is rewound onto the supply reel, the snubber roll 62 is disengaged and acts merely as an idler. As will appear, that may ocur either during the processing of the film while rewinding or during subsequent rewinding of the processed film after projection.

The film processing means will next be described in its presently preferred embodiment with reference first to FIG. 5. As is here shown, the apparatus generally comprises wall means comprising portions of or formed integral with the base plate 47 and the cover plate 50 which serve to guide, support, and house the various elements of the processing apparatus to be described. These walls form an outer film composition containing housing generally designated 83 defining a chamber in which there is mounted 29 an initially sealed container generally designated 84 of processing composition. The container 83 communicates with a coating nozzle generally designated 85. These elements are mounted above the plane of the film 26.

Principally located below but in part surrounding the film 26 is a pressure pad generally designated 86. The pressure pad 86 is acted on by a spring generally designated 87 and to be described in more detail infra.

The basic elements of the processing station further comprise a combined pressure pad deflection cam and nozzle closure valve assembly generally designated 88 and the pair of electrical contact terminals 58 and 59. The terminals 58 and 59 cooperate with the cam and valve assembly 88 in a manner to be described infra to provide a signal indicating whether or not the film 26 has been processed.

More specifically, the outer container 83 comprises walls 89 formed integral with the floor plate 87 and extending upwardly therefrom. The walls 89 and the floor plate 87 form a container open on a side that is closed by a cover panel fragmentarily shown at 90 of the same general configuration as the region bounded by the walls 89 of the container 83.

The panel 90 is preferably put in place prior to assembly of the cover 49 with the base 45 and serves as a support for the top plate 50 after final assembly. As schematically indicated, the walls 89 are formed with an upper lug 91 and a lower edge portion 92 in each of which are formed locating recesses 93 and 94, respectively, adapted to receive corresponding locating posts, not shown, formed on the inside of the cover panel 90 to aid in locating the panel 90 during its installation as the cover of the container 83.

The initially sealed container 84, mounted within the outer container 83, comprises a tube-like receptacle 95 of a suitable plastic or the like selected to resist interaction with the processing composition or permeation thereof by ambient gases. The receptacle 95 initially contains a charge 96 of processing composition in an adequate amount to process the film 26.

The receptacle 95 is formed on an open side with a circumscribing flange 97 adapted to fit into corresponding slots formed in the base plate 47 and the cover panel 90. As best seen in FIG. 5, the flange 97 rests against a shoulder formed on the lug 91 at the upper end of the wall 89 and projects over the ledge 92 formed at the lower end of the wall 89.

The container 84 is sealed to initially contain the processing composition 96 by one end 98 of a tear tab generally designated 99. The tear tab 99 may be made of any suitable form of plastic material selected to resist the action of the composition 96 and to avoid interaction therewith as well as to prevent the diffusion into the composition of gases such as oxygen, carbon dioxide, carbon monoxide, water, oxides or hydrides of sulfur or nitrogen or the like that might modify its composition. The end 98 is sealed to the plane surface of the flange 97 surrounding the opening formed in the receptacle 95 and within the flange area extending into the mounting recesses described above by any suitable means such as heat sealing by any suitable means.

The tear tab 99 extends from the end 98 sealed to the receptacle 95 back upon itself and out through an aperture 100 formed in the walls 89 to the processing composition release mechanism, to be described infra.

Outside of the sealed container 84, the walls 89 define a chamber 101 into which the processing composition 96 can flow when the tear tab 99 is partially detached from the receptacle 95 in a manner to be described. The chamber 101 communicates with the coating nozzle 85 by way of a downwardly converging section 102 that communicates with a downwardly converging inlet passage formed in the nozzle 85.

Referring again to FIGS. 5, 15, 16, the coating nozzle 85 may be formed in a conventional manner, as by precision molding or the like, from a suitable thermoplastic resin selected to form a dimensionally stable and accurate molding whose working surfaces can be kept at close tolerances. The most critical of these form a plain, generally U-shape film engaging land 103 formed on the base of the nozzle 84, as best seen in FIG. 15, and a doctor bar 104 lying across the bend of the U-shape land 103 and recessed beneath it, as best seen in FIG. 16.

Figure 15:
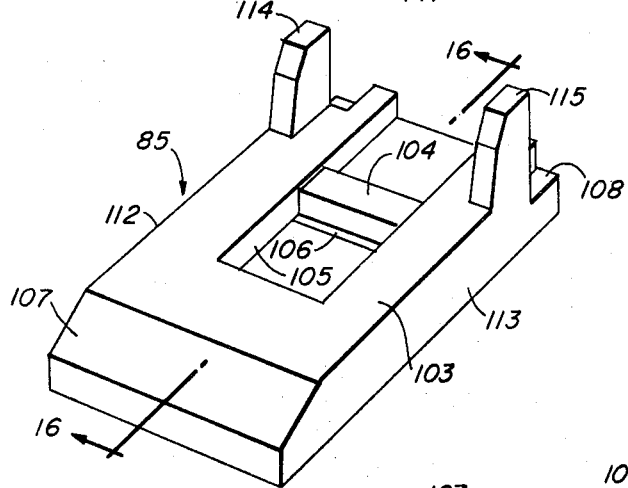
FIG. 15 is a simplified perspective of a coating nozzle forming a part of the apparatus of FIG. 5.
Figure 16:
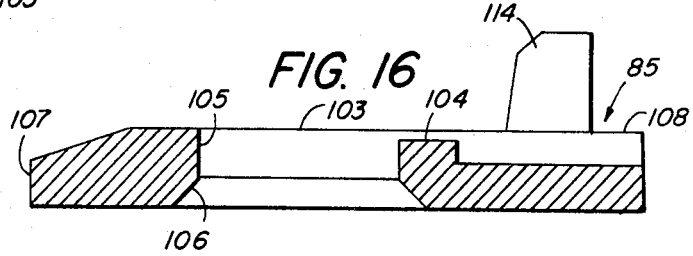
FIG. 16 provides a simplified cross-sectional elevation of the nozzle of FIG. 15 taken substantially along the lines 16—16 in FIG. 15.

The depth to which the doctor bar 104 is recessed is greatly exaggerated in FIGS. 15 and 16; it is selected to be twice the desired thickness to which the coating composition is applied to the film 26. The land 103 and the doctor bar 104 circumscribe a generally rectangular outlet aperture 105 formed in the nozzle and communicating with the downwardly converging passageway 106 through which the processing composition is received from the outer container 83, described supra.

The nozzle 85 is formed to be received in cooperating slots formed in the housing parts to hold it in the position shown in FIG. 5. Referring to FIGS. 5 and 15, the ends 107 and 108 of the nozzle 85 engage corresponding notches 109 and 110 formed in an extension 111 of the wall 75 and in the ledge 92, respectively, to receive the nozzle 85. The sides 112 and 113 of the nozzle 85 are retained by the base plate 47 and the cover plate 50 of the housing.

The nozzle 85 is provided at the side with posts 114 and 115 that provide guidance for the film in its path over the coating gap. These posts also serve at times to stop the nozzle closure valve assembly portion of the element 88. Referring now to FIG. 15, when engaged with the film in a manner to be described infra, the film is adapted to pass over the nozzle outlet portion and between the posts 114 and 115 with the emulsion side of the film in engagement with the land 103. During this engagement, coating takes place while the film moves so that the emulsion surface leaves the aperture 105 as it passes over the doctor bar 104 and carries with it a coating of processing composition established by the depth to which the bar 104 is recessed below the land 103.

As best seen in FIGS. 4 and 5, the pressure pad 86 will next be described. The pressure pad 86 is illustrated in the initial position assumed upon assembly of the cassette prior to processing of the film 26. The film 26 normally passes below the nozzle 85 and above a normally disengaged film engaging pad surface 116. The pad surface is formed on an upwardly extending and generally rectangular protrusion in a base plate 117, best illustrated in FIG. 14. The pressure pad 86 may be made of any suitable conventional material, such as stainless steel or the like. The raised surface 116 formed by dye stamping or the like is ground or otherwise finished with a film engaging plane surface 118 of generally U-shape configuration that is adapted to mate, through the film 26, with the plane of the land 103 of the nozzle 85 and generally conforms to the working area of the nozzle 85 confined between the land 103 and the doctor bar 104 and encompassing the rectangular opening 105 through which the processing composition passes.

Figure 14:
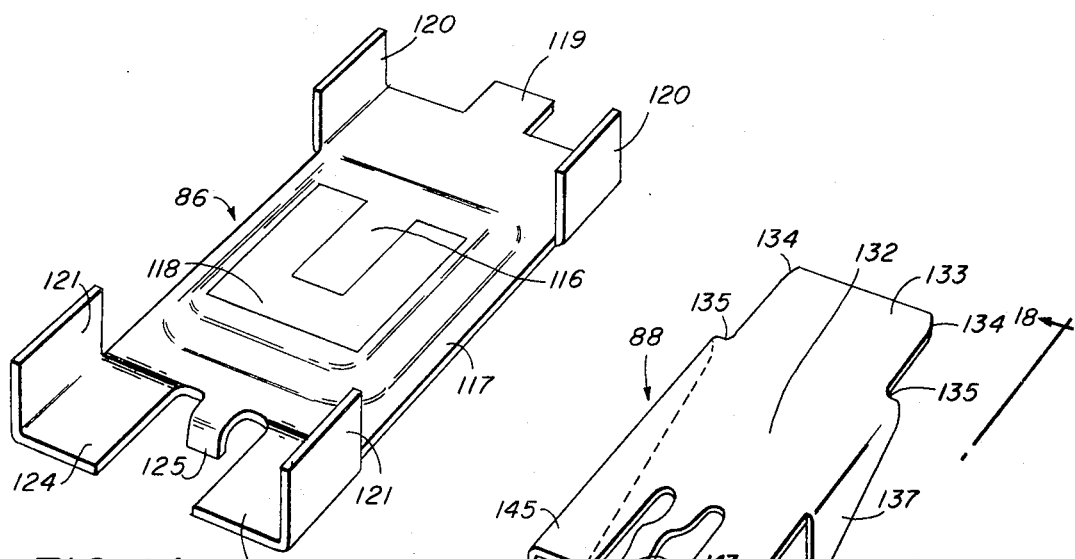
FIG. 14 provides a simplified perspective of a pressure pad forming a part of the apparatus of FIG. 5.

As best seen in FIGS. 5 and 14, the pressure pad 86 is formed with an end 119 that is adapted to lightly engage the base side of the film 26 in the initial position shown in FIG. 5, for purposes to appear. Formed adjacent the end 119 on the plate 117 and extending outwardly therefrom is a pair of ears 120 adapted to extend up past the film 26 on either side and to ultimately engage the under side of the nozzle 85.

The pressure pad 86 is formed at its other end with a pair of upstanding ears 121 formed integral with the plate 117 and extending upwardly past the film in FIG. 5 to engage a sloping ledge 122 formed in the lower side of an extension 123 is formed integral with the base plate 47 and joins the wall 75 defining the projection aperture.

The ears 121 initially hold the film engaging surface 116 of the pressure pad 86 out of engagement with the film. As will appear, the ears 121 of the pressure pad 86 also serve at times as guides for the combined pressure pad depressing cam and nozzle closure valve assembly 88.

The base plate 117 of the pressure pad 86 is divided to form a pair of legs 124 which are bent downwardly somewhat in the region of the ears 121 as suggested in FIG. 14. Between the legs 124 is formed a downwardly depending hook element 125 that initially serves as a detent to hold the pressure pad 86 in an inactive position in the housing. For that purpose, as best shown in FIG. 5, the hook 125 is engaged in the initial position shown by an upwardly bent end 126 formed at the end of the spring 87.

As best seen in FIG. 5, the spring 87 comprises a base portion 127 that is cut out to clear a bearing post 128 on which the idler roll 57 is journalled. The base portion 127 is further provided with a pair of mounting apertures in which suitable fasteners, shown as a pair of screws 129, can pass for securing the base 127 to the base plate 47. In practice, the base 127 of the spring 87 may be secured by heat staking it to the thermoplastic material of the base plate 47 as by heating and melting a portion of the base plate 47 through the apertures in the base 127. Alternatively, the spring 87 may be secured by rivots or other fasteners or the like could be employed.

On the base portion 127 a resilient spring arm 130 extends, and planes normal to the base, into engagement with the film engaging portion of the pressure pad 86, and thence to its termination 126 initially engaged with the hook 125. Intermediate the ends of the arm 130 is formed a pressure pad engaging button 131 (fragmentarily shown in FIG. 12) that serves to engage the lower surface of the raised surface 116 of the pressure pad 86 and urge it toward engagement with the film 26.

Figure 17:
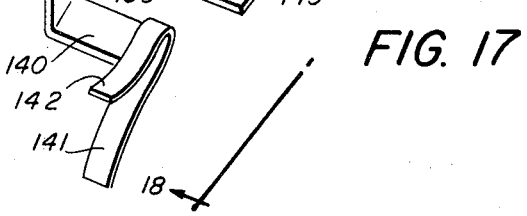
FIG. 17 provides a simplified perspective of a pressure pad depressing cam and nozzle closure plate assembly forming a part of the apparatus of FIG. 5.
Figure 18:
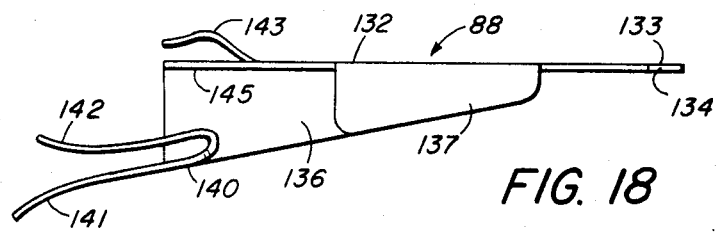
FIG. 18 provides an elevational view of the apparatus of FIG. 17 taken substantially along the lines 18—18 of FIG. 17.

Looking again to FIG. 5 in conjunction with FIGS. 17 and 18, the pressure pad depressing cam and nozzle closure valve assembly 88 will next be described. Referring first to FIGS. 17 and 18, the assembly 88 is seen to comprise a plane base plate 132 formed at one end 133 with tapering sides 134 to guide the entry of the end 133 into a position covering the outlet aperture 105 and the nozzle 85, as will appear infra, to close the nozzle 85 at the end of the processing operation. In that position, a pair of shoulders 135 on the plate 132 cooperate with the posts 114 and 115 on the nozzle 85 to stop the nozzle in its final position. Formed as orthogonal extensions in the sides of the base plate 132 are a pair of cams 136 and 137 that serve at times to depress the pressure pads 86 in a manner to appear infra.

The cam 137 is shorter than the cam 136 to facilitate threading of the film 26 during assembly of the cassette. Toward the left end of the plate 132, as best shown in FIGS. 17 and 18, the cam 136 is formed with a normally extending arm 140 that extends generally parallel to the plate 132 and is formed with a pair of spring arm extensions 141 and 142. These arm extensions taper away from each other towards the ends to allow entry of a film aperture in a manner to appear.

A central portion 143 is bent upwardly and away from the leg extension portions 145 of the base plate 132, as best shown in FIG. 17, to form a hook having as its upper portion the extension 143 and as its lower portion the arms 145. Referring again to FIG. 5, these hook elements initially engage a ledge portion 146 formed integral with the base plate 147 to hold the assembly 88 in the position shown. In that position, the cams 136 and 137 extend into and are guided by the ears 121 and the nozzle closing plate end 133 of the assembly 88 confronts but does not engage a downwardly sloping guide ledge 147 formed on the wall extension 111 referred to supra.

The upper spring arm 141 of the hook comprising that arm and the lower arm 142 formed on the assembly 88 lightly engages the base of the film 26 in the initial position of the parts shown in FIG. 5. The upwardly bent end of the arm 141 thus serves as a unidirectional detent that is adapted to engage a film, in a manner to be described infra, toward the end of the processing cycle.

The cam portion 136 of the assembly 88, of metal conducting material, cooperates with the contacts 148 and 149 formed integral with the terminals 58 and 59, respectively (FIG. 5), to form a signal generator indicating whether or not the film 26 has been processed. For this purpose, in the initial position of the parts shown in FIG. 5 assumed before the processing cycle is started, the cam 136 engages both contacts 148 and 149 and thus urges them to supply an external signal, in the form of a closed circuit path, to the terminals 58 and 59 indicating to the film drive and projection apparatus that the film is not processed. At the end of the processing, the assembly 88 will be carried to the right in FIG. 5 opening the contacts 148 and 149 to cause an open circuit to be presented to the terminals 58 and 59 indicating that the film has been processed.

The construction of the processing composition release mechanism will be described with reference to FIGS. 5, 7, 8, 9 and 10. As shown in FIG. 5, the tear tab 99 extends out through the aperture 100 in the outer container 83 and thence over an idler 150 journalled for rotation in the housing by means schematically shown as a bearing post 151 formed integral with the base plate 47. The tear tab 99 passes from the idler 150 about another idler, here shown simply as a post 152, formed integral with the floor plate 47.

A loop 153 is formed on the end of the tear tab 99, as by folding the tear tab back upon itself and there securing it by heat sealing or by a suitable adhesive or the like. The loop 153 engages a pin 154 forming a part of the tear tab release mechanism. As best seen in FIG. 7, the pin 154 is adapted to be guided in tracks formed as grooves 155 in the cover plate 50 and 156 in the floor plate 47. These tracks form parallel, generally spiral path segments that guide the posts 154 along a path generally radially outward from the center of the supply reel 51, from the initial position shown in FIG. 5 to the position shown in FIG. 10.

The pin 154 is joined to a post 157 connected to or formed integral with the arm 55 described supra. For this purpose, a pair of struts 158 and 159 of steel wire or the like are connected at their ends to the pin 154 and post 157, as illustrated in FIG. 7, to form a generally rectangular slit having one end that travels along a radius determined by the arm 55 and a second end formed by the pin 154 that travels in the tracks 155 and 156.

A resilient catch generally designated 160 is connected at one end to the strut just described. The catch 160 may be formed of a resilient material such as spring steel or the like and has one end 161 bent around and engaging the post 157. The catch 160 extends from the end 161 over an arm 162 formed with outwardly diverging ears 163 and 164. The ear 163 is bent over and thereby secured to the strut 158 and the ear 164 is bent over and thereby secured to the strut 159. The arm 162 is bent at its other end to form an actuator engaging ledge 165.

The ledge 165 extends to an integral hook portion 166 that is initially engaged by a detent pin 167 forming a part of a tear tab release enabling mechanism to be described.

Upon removal of the pin 167, the arm 162 is free to move under the influence of its initial bias to carry the hook 166 into engagement with the pin 154, whereupon the ledge 165 will be moved into position to engage one of a series of teeth 168 formed about the periphery of the flange 52 of the supply reel 51. The supply reel 51 is provided with a lower flange 169 upon which corresponding teeth 170 in vertical registry with the teeth 168 are formed.

As best seen in FIG. 5, the teeth such as 168 each comprise a slowly radially rising portion 171 and a rapidly radially falling portion that is adapted to engage the ledge 165 when the ledge is released by the release of the pin 167 and when the reel is rotated clockwise in FIG. 5. In the position of the parts illustrated in FIG. 5, the ledge 165 is held out of engagement with the teeth 168. Upon release of the hook 166, the ledge 165 will engage the rims of the supply reel 51, whereupon in response to a counterclockwise rotation of the spool as shown in FIG. 5, the ledge will simply be deflected by the slowly rising portion such as 171 of the teeth 168. However, upon clockwise rotation one of the teeth 168 will be caught upon the ledge 165 and carry the sled along the tracks 155 and 156, moving the tear tab 99 and at least partially detaching it from the receptacle 95 to release the composition 96. When the sled is thus moved to the position shown in FIG. 10, the post 154 will be engaged by a resilient detent 172 secured to an extension 123 of the wall 75, latching the mechanism in the position shown in FIG. 10 with the ledge 165 then permanently out of engagement with the teeth 168.

Thus, the release enabling mechanism comprising the pin 167 will next be described with reference to FIGS. 7, 8, and 9. As best seen in FIG. 8, the mechanism comprises a post 175 accessible at one end through the opening 16 in the cover plate 50. A lighttight seal is formed about the opening 16 by means of a cylindrical flange 176 formed integral with the cover plate 50 and extending between the post 175 and a concentric cylindrical flange 177 formed integral with the post 175. At its lower end, the post 175 is formed with a coaxial central cylindrical recess 178 which receives a compression spring 179. The spring 179 engages the base plate 47 and is surrounded by a cylindrical annular flange 180 in which the post 175 is guidingly received. The post 175 is thus urged into the position shown in FIG. 8 by the spring 179. It is adapted to be moved into the position shown in FIG. 9 by a locating pin 181 forming a part of the film drive and projection system that enters the port 16 to depress the post 175.

The detent pin 167 is formed integral with an extension 182 of the post 175, which extension 182 is adapted to rest against the loop 153 formed on the end of the tear tab 99 and therethrough to engage and be supported by the pin 154 in the initial position of the parts shown in FIGS. 5 and 7.

When the locating pin 181 enters the opening 16 to move the post 175 to the position shown in FIG. 9, the hook 166 is free to move into engagement with the pin 154 through the loop 153. The sled, including the pin 154, is thereafter free to move out of engagement with the extension 182 formed on the post 175.

Referring again to FIG. 5, it will be assumed that an initially unexposed strip of film 26 stored primarily on a supply reel 51 has been exposed in a camera so that it has been advanced onto the take-up reel 63 to the exposure termination point determined by the first elongated sprocket hole 39 in the film 26 (FIG. 4). The tear tab 99 and its release mechanism will be in the position shown in FIG. 5, with the post 175 in the position shown in FIG. 8, the which the pin 167 engages the hook 166 to hold the catch ledge 165 out of engagement with the rims of the supply reel.

Next, assume that operation continues by the insertion of the rotating pin 181 into the port 16 of the cassette. As shown in FIGS. 8 and 9, entry of the pin 181 will depress post 175, releasing the pin 167 and allowing the hook 166 to travel into engagement with the loop 153 on the tear tab 99 and, therethrough, with the pin 154. Referring again to FIG. 5, the ledge 165 will now be moved into position to engage the teeth such as 168 formed on the supply reel 51.

Next, assume that operation is continued by further rotation of the take-up reel 63 counterclockwise, as seen in FIG. 5, to bring the film 26 further onto the take-up reel. During such rotation, the supply reel 51 will move counterclockwise in FIG. 5 causing the teeth 168 to pass the ledge 165 without effective engagement therewith.

FIG. 5 shows the parts of the coating station in their initial position which is maintained during exposure of the film and during a portion of the first increment of motion just described from the exposure termination point toward the second termination point in which the film is substantially exhausted from the supply reel and in which the second elongated sprocket hole 40 in FIG. 4 will be encountered. During the interval to travel between those positions and prior thereto, the cam and nozzle closure valve assembly 88 is held in place by engagement of the arms 143 and 145 with the ledge 146, and the upper resilient arm 141 of the film engaging hook formed on the assembly 88 is lightly engaging the base of the film 26.

The pressure pad 86 is initially held in place by engagement of its hook 125 with the detent 126 formed on the spring 87. In that position, the end 119 of the pressure pad 86 lightly engages the base of the film 26 and the ears 121 are in engagement with the ledge 122 formed on the wall segment 123.

Figure 11:
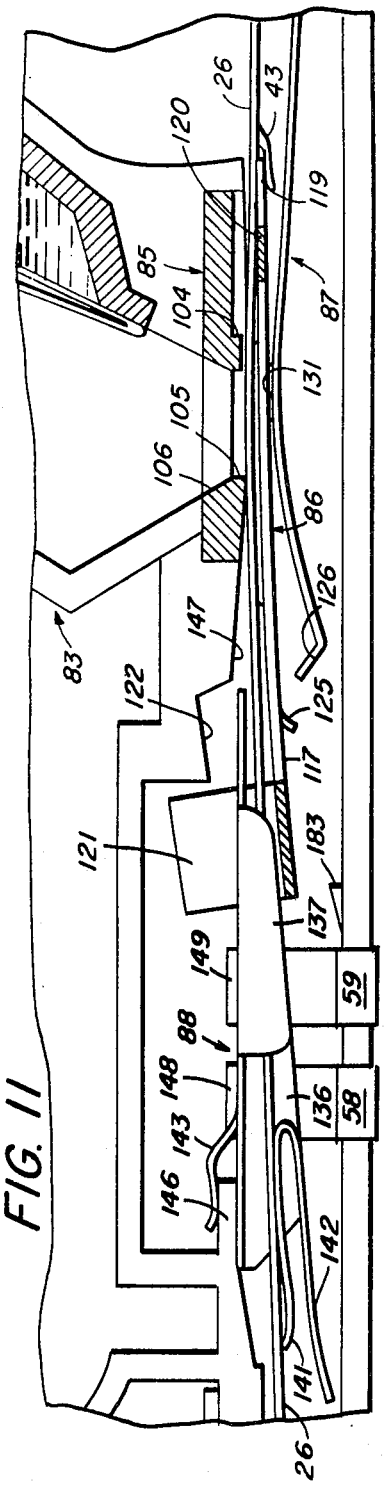
FIGS. 11, 12, and 13 provide fragmentary plans, partly in section with parts omitted and parts broken away, showing on an enlarged scale the sequence of operation of processing apparatus forming a part of the apparatus of FIG. 5.

The parts of the coating station will remain in the position shown in FIG. 5 until, during the further advance of the film 26 toward the take-up reel, the film engaging hook 43 approaches and engages the end 119 formed on the pressure pad 86 as seen in FIG. 11. When that occurs, near the second termination point established by the second elongated hole 40 in the film 26, the hook 43 will move the pressure pad to the left in FIG. 11 to the position shown in which the ears 121 have moves out of engagement with the ledge 122 and upwardly under the influence of the spring 87. The ears 120 on the pressure pad 86 will come into engagement with the posts 114 and 115 forming a part of the nozzle 85 and the pressure pad 86 will swing up into engagement with the film 26 and carry the emulsion side of the film into coating engagement with the nozzle 85.

Next assume that the first rewind operation is begun by rotating the supply reel 51 clockwise in FIG. 5 to advance the teeth such as 168 toward the ledge 165 on the latch 160. Referring to FIG. 11, this motion will bring the hook 43 out of engagement with the end 119 of the pressure pad 86, as shown. The pressure pad will now urge the film 26 into coating engagement with the nozzle 85 under the influence of the spring 87.

As the pressure pad 86 is moved to the left, the detent 126 formed on the spring 87 will be disengaged by the hook 125. The purpose of the detent 126 is primarily to prevent premature movement of the pressure pad 86 in the housing prior to its positive disengagement from the initial position shown in FIG. 5 by the hook 43.

Referring next to FIGS. 5, 7, and 10, as the film 26 moves toward the supply reel 63, a pair of teeth 168 and 170 on the supply reel will engage the ledge 165, and the latch 160 will carry the sled comprising the pin 154 to the position shown in FIG. 10 detaching the tear tab 99 in part from the receptacle 95 to allow the composition 96 to flow down into coating engagement with the nozzle and the film 26. The composition will then be uniformly coated on the emulsion side of the film 26 to a thickness determined by the doctor bar 104.

A doctor bar coater is preferred to other conventional forms of coaters for the purpose of coating the film because it is inherently insensitive to changes in the viscosity of the processing composition and to changes in linear film speed with respect to the doctor bar over a reasonable range that makes the process relatively insensitive to these variables. In particular, as is well known in the art in other contexts, a doctor blade or doctor bar coater inherently will lay down a uniform coating of approximately one-half the distance between the doctor bar and the coated substrate under conditions in which a uniform meniscus can be formed on the coating liquid adjacent its interface with the substrate.

The coating operation, begun with the parts in the position shown in FIG. 10, will continue until the composition 96 is substantially exhausted and the film is stored substantially all on the supply reel 63. Toward the end of that operation, the aperture 44 (FIG. 4) will approach and engage the spring arm 141 formed on the valve and cam assembly 88.

Figure 12:
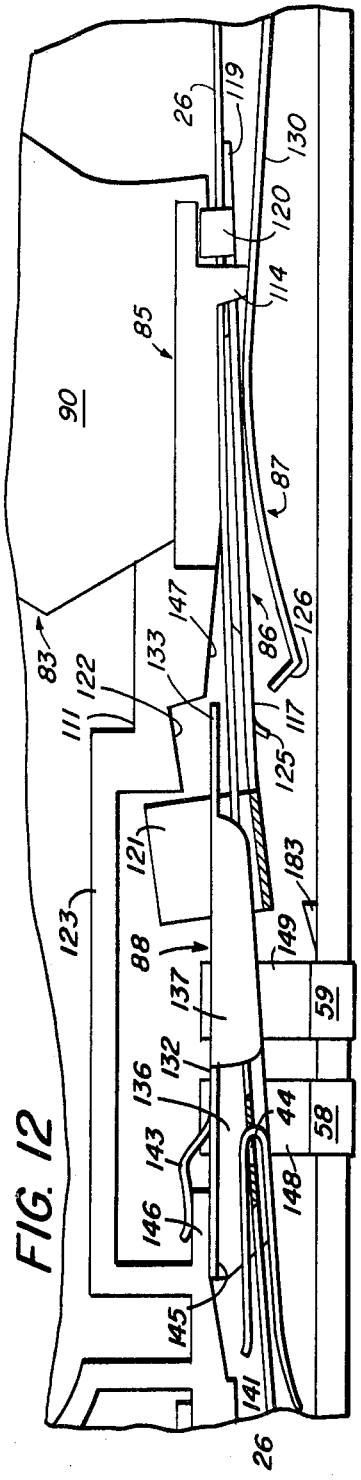

As the film 26 continues to move onto the supply reel, engagement of the aperture 44 in the film with the spring arm 141 will carry the film along the arm and downwardly, as suggested in FIG. 12, into the bite formed between the arms 141 and 142. Further movement of the film 26 toward the supply reel will carry the cam and valve member 88 to the right of the position shown in FIG. 12, causing the spring arms 143 and 145 to disengage the ledge 146 and bringing the cams 136 and 137 into contact with the base plate 117 of the pressure pad 86 in the region of the ears 121, with the cam assembly 88 being guided by the ears 121, as such assembly 88 moves to the position shown in FIG. 13.

During this movement, the end 133 of the cam and valve assembly 88 is guided by the ledge 147 formed on the wall extension 111 of the housing and moves below the nozzle 85 toward a nozzle closing position. The pressure pad 86 begins to move downwardly out of engagement with the film 26. The film is still held down out of its normal plane of movement by engagement with the bits formed between the spring arms 141 and 142.

Figure 13:
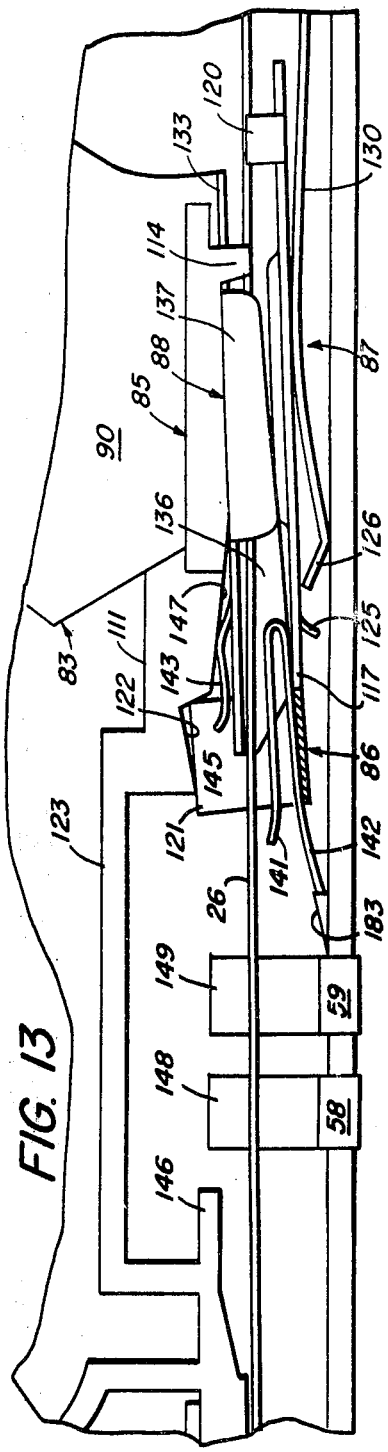

Movement in this direction will continue to move the assembly 88 to the right, as it goes to the position shown in FIG. 13 in which the end 133 of the valve assembly 88 closes the nozzle 85 and the shoulders 135 formed on the assembly 88 engage the stops 114 and 115 formed on the nozzle 85. The lower spring arm 142 glides over and engages a stop 183 which may conveniently be formed integrally with the cover wall to latch the cam assembly 86 against movement to the left as shown in FIG. 13.

During its movement from the position shown in FIG. 12 to the position shown in FIG. 13, the cam 136 disengages the contacts 148 and 149 and thus provides a signal indicating that the film has been processed.

FIG. 13 illustrates the final disengaged position of the processor parts with the film 26 out of engagement with the hook elements 141 and 142. This position is maintained when the film is again moved toward the take-up reel, as during projection of the processed film. When that occurs, the aperture 44 will disengage the arm 141 and the film will rise to its initial plane of movement in which it is free of all of the elements of the processing apparatus for subsequent cycles of projection and rewinding.

The nozzle 85 is now closed except for the small passage between the doctor bar and the upper surface of the valve end 133 of the assembly 188. Since this is quite a small aperture, on the order of several ten thousandths of an inch, it will quickly be sealed by the evaporation of the vehicle from the processing composition with concomitant drying and hardening of the composition in the gap. Contamination of the apparatus is further prevented by the fact that any leakage of processing composition that may occur will be primarily upon the upper surface of the end 133 of the assembly 88 where it will be exposed to drying without further contact with the film.

Referring again to FIG. 4, the film strip 26 is seen to include a pair of rails 184 and 186 which extend along the longitudinal margins of the film strip 26 and function to space adjoining turns of the film strip when it is would on the supply reel 51 when it is wound on the supply reel 51 immediately following the deposition of the processing composition 96. The rails 184 and 186 may be formed integral with the base of the film strip 26 (on the face opposite the emulsion and processing composition receiving face) or discrete strips may be adhesively attached to the film strip 26 to form the rails 184 and 186.

Advantageously, one or both of the rails 184 and 186 may also be utilized for sound recording. For example, both rails may be utilized for magnetic recording for stereophonic purposes or for any other arrangements wherein two different audio signals are to be stored and later retrieved.

Hence, each of the rails 184 and 186 may be formed of a magnetic oxide material such as is employed for conventional magnetic recording. However, inasmuch as the rails 184 and 186 must also function for film spacing when the film is in a wet condition on the supply reel 151, the rail thickness is thereby determined by and generally significantly exceeds that of the processing composition layer; it will generally be thicker than the 0.0003 inch magnetic oxide thickness generally employed for magnetic recording. It should be noted that a magnetic film over 0.0003 inch thick, and which produces only marginal advantages as regards to recording and reproduction function, is difficult to produce with desired surface flatness necessary for proper audio operation and with the flexibility necessary for this type of compact cassette arrangement. Accordingly, the magnetic oxide film may comprise a thin surface coating on each of the rails 184 and 186.

Figure 19:
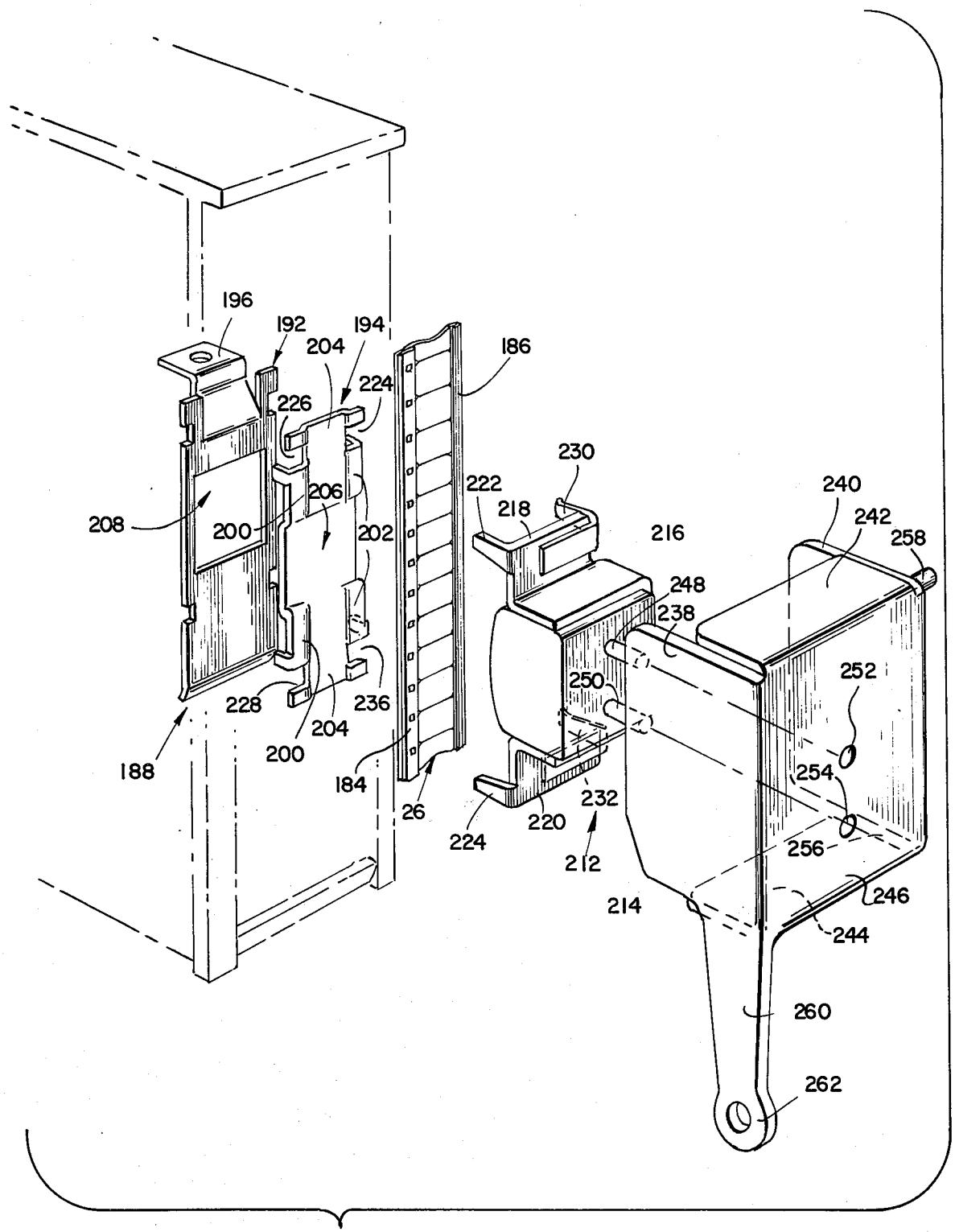
FIG. 19 provides a simplified exploded perspective of the novel support plate and magnetic recording and playback head of the subject invention.

As best seen in FIG. 19, for the purposes of the present invention the film strip 26 is provided with a single sound track which comprises a 0.0003 inch thick magnetic oxide layer overlying a rail having a thickness of from about 0.0007 inch to approximately 0.0017 inch thick, which together form the rail 186.

As best seen in FIGS. 5 and 10, a support plate 188 is disposed within one end portion of the cassette 1 between the housing 83 and a side wall 46 of said cassette 1. The support plate 188 is accessible through an aperture 190 in one of the walls 46 as will be more apparent infra.

As best seen in FIG. 19, the support plate 188 is seen to comprise a lower portion 192 and an upper portion 194. The lower portion 192 extends at one end portion to a resilient bent tab 196 which is fastened to the wall 89 of the housing 83, as by a pin 198 (FIG. 5), such that the lower portion 192 of the plate 188 is cantilevered within the cassette 1.

The upper portion 194 of the support plate 188 is configured to define laterally spaced raised support strips 200 and 202 along its longitudinal edges and which define a longitudinally extending trail portion 204 therebetween. The support plate 188 is further configured to define a recessed generally rectangular center portion 206 which is adapted to be received in a mating recess 208 within the lower portion 192. The upper portion 194 is secured to the lower portion 192 in a well-known manner with the recessed center portion 206 received within the recess 208 to thereby define the support plate 188 which it can now be seen is resiliently cantilevered within the cassette 1 by means of the bent tab 196 and the pin 198. It should be emphasized at this point that while the support plate 188 is resiliently mounted within the cassette 1 so as to be movable toward and away from the aperture 190 against the bias of the resilient bent tab 196, said plate 188 is otherwise rigidly secured within the cassette 1 by the pin 198.

As best seen in FIGS. 5, 10, 19, and 20, the film strip 26 within the cassette 1 passes over the support plate 188 between the housing 83 and the aperture 190 in traversing the path from the bobulator roll 56 to the idler roll 57. The base portion or emulsion side of the film 26 bearing the processing composition 96 passes over the support plate 188 such that the support strip 200 is underneath the rail 184 and the support strip 202 is positioned underneath the rail 186 which bears the magnetic sound track.

As best seen in FIG. 10, it should be emphasized at this point that while the film strip 26 passes over the support plate 188 as aforesaid, it does not normally come into contact with the plate 188 as indicated by the space 210 therebetween. As will appear hereinafter, the film strip 26 does contact the support plate 188 while recording or playing back audio signals on the sound track and in the passage of the film strip 26 over the support plate 188 during the recording and playback mode, only the edge portions of the film strip 26 will come in contact with portions of the support plate 188 such that there will be no interference with the porcessing composition 96 which, as will be seen infra, may not be dry at the time that the film strip 26 is passing over the support plate 188.

As best seen in FIG. 19, a magnetic recording and playback head is illustrated generally at 212 and is seen to include a housing shield 214 and a transducer 216. The transducer 216 is of a six-sides configuration and a construction well known in the art such that a magnetic audio signal may be impressed on the sound track provided on the rail 186 and subsequently be replayed therefrom.

The transducer 216 is provided with identical, spaced, guide shields 218 and 220 which are secured to opposite faces thereof in a well-known manner. The guide shields 218 and 220 are provided with locating pins 222 and 224, respectively, which are adapted to extend over the edge portion of the film strip 26 adjacent the rail 184 and engage the apertures 226 and 228, respectively, in the support plate 188. The guide shields 218 and 220 are further provided with resilient bent tab members 230 and 232, respectively, which are fixed thereto in a well-known manner in spaced, parallel relation to the locating pins 222 and 224, respectively. The resilient bent tab members 230 and 232 are adapted to extend over the edge portion of the film strip 26 adjacent the rail 186 and engage apertures 234 and 236, respectively, in the support plate 188.

As best seen in FIG. 19, the housing shield 214 is configured to define an enclosure for receiving the transducer 216 comprising five sides of a six-sides box including laterally spaced, parallel faces 238 and 240, upper and lower spaced, parallel faces 242 and 244, and cover face 246. The sixth side of the enclosure is formed by the support plate 188 when the magnetic recording and playback head 212 is in its operative position. The transducer 216 is secured to the housing shield 214 within the five-sides enclosure aforesaid, as by pin means 248 and 250 which are secured to the transducer 216 is a well-known manner and are secured to the cover face 246 of the housing shield 214 via the locating holes 252 and 254, respectively, in a well-known manner to accurately register the transducer 216 with respect to the housing shield 214.

It should be emphasized at this point that both the housing shield 214 and the support plate 188 are constructed of a material having high magnetic permeability such as mu-metal to provide effective shielding against undesired electromagnetic and electrostatic interference.

As best seen in FIG. 19, the lower face 244 of the housing shield 214 extends only part way between the laterally spaced faces 238 and 240 so that a slot 256 is defined therebetween. Further, the face 240 is provided with pin means 258 secured to an upper edge portion thereof proximate the faces 242 and 246.

As best seen in FIGS. 5, 10, and 19, the face 238 extends to a swing arm 260, the end portion 262 of which is pivotally secured to an end wall 264 of the pocket 2 (within the film and projection system 4) as by a journal box 266 and pin means 268 in a well-known manner.

Referring again to FIG. 10, a kinematic drive assembly disposed within the film drive and projection system 4 is illustrated generally at 270. The kinematic drive assembly 270 is seen to include a support plate 272 pivotally secured within the film drive and projection system 4 in a well-known manner as by pin means 274. A drive disk 276 is rotatably secured to one end portion of the support plate 272 as by an axle pin and journal assembly 278 so as to be rotatable about the assembly 278 and pivotable with the support plate 272. The disk 276 is provided with a circular friction ring 280 disposed about its periphery. A capstan wheel 282 is fixedly secured to the face of the drive disk 276 and is rotatable therewith about the axle pin and journal assembly 278. The drive disk 276 is itself driven by means of a motor 284 and a motor shaft 286 which engages the friction ring 280 such that the rotational output of the motor 284 will effect the rotation of the drive disk 276 and, hence, the rotation of the capstan wheel 282.

A generally L-shape actuating arm 288 extends outward of one end of the support plate 272 and over the face of the drive disk 276 to an end portion 290 which is receivable within the slot 256 and engages the inner surface of the cover face 246 of the housing shield 214. A cam follower link 292 is pivotally secured to the support plate 272 in a well-known manner such that the axial movement of the cam follower link 292 will effect pivotal movement of the support plate 272 about the pin means 274. In the position illustrated in FIG. 10, the cam follower link 292 has effected clockwise pivotal movement of the support plate 272 about the pin 274 thereby disengaging the capstan wheel 282 and removing the magnetic recording and playback head 212 to its idle position.

In the position illustrated in FIG. 5, the support plate 272 has been pivoted counterclockwise about the pin means 274 engaging the capstan wheel 282. It should be noted at this point that the magnetic recording and playback head 212 is biased toward its operative position by means of a tension spring 294 which is connected between the pin means 258 on the housing 214 and a pin 296 secured to the film drive and projection system 4 within the pocket 2 in a well-known manner.

In the idle, inoperative position of the magnetic recording and playback head 212 illustrated in FIG. 10, the spring 294 biases the head 212 counterclockwise about the journal box 266 and pin means 268 via the swing arm 260 such that the end portion 290 of the L-shape actuating arm 288 resiliently engages the inner surface of the cover face 246 of the housing shield 214. Upon actuation of the cam follower link 292, as more fully described in copending application Ser. No. 374,578, filed June 28, 1973, and commonly assigned herewith, the support plate 272 will be pivoted counterclockwise about the pin means 274 and the components of the magnetic recording and playback head 212 and those of the kinematic drive assembly 270 will be caused to assume the position shown in FIG. 5 which is the operative position for recording and playing back audio signals. As the support plate 272 is pivoted counterclockwise about the pin 274 by the cam follower link 292, the L-shape actuating arm 288 will move away from the position shown in FIG. 10 toward the aperture 190 in the cassette 1. The tension spring 294 will cause the end portion 290 of the arm 288 to remain in engagement with the inner surface of the cover face 246 and a portion of the head 212 will pass through an aperture 298 in the pocket 2 and also enter the aperture 190 in the cassette 1 as the head 212 assumes its final operative position which, as best seen in FIG. 21, is limited by a shoulder 300, integral with the base plate 47 of the cassette 1, which receives a portion of the transducer 216.

As the head 212 partially enters the aperture 190, the locating pins 222 and 224, as well as the resilient bent tab members 230 and 232, will overlap the edges of the film strip 26 and the tabs 230 and 232 will resiliently urge the film strip 26 toward said locating pins 222 and 224 whereby the edge of said film strip 26 proximate the rail 184 will be brought into abutment with the locating pins 222 and 224. As the head 212 continues to approach its operative position of FIG. 5, the locating pins 222 and 224 will enter the apertures 226 and 228, respectively, and the tab members 230 and 232 will enter the apertures 234 and 236, respectively, to thereby establish predetermined registration between the transducer 216 and the support plate 188. Additionally, inasmuch as the locating pins 222 and 224 and the tabs 230 and 232 are precisely positioning the film strip 26 with respect to the transducer 216, predetermined registration will be established between the magnetic sound track and the rail 186 and said transducer 216. Prior to the reaching of its operative position of FIG. 5, the transducer portion 216 of the head 212 will abut the sound track disposed along the rail 186 of the film strip 26 and as the heat 212 moves into its final, limited position, the base or emulsion bearing surface of the film strip 26 will be brought into engagement with the support plate 188. More specifically, the transducer 216 will cause the portion of the base side of the film strip 26 beneath the rail 186 to abut the support strip 202 and the portion of the base side of the film strip 26 beneath the rail 184 will be brought into abutment with the support strip 200.

It will be recalled that the support plate 188 is resiliently mounted with respect to the base 47 (more specifically, the walls 89 integral with the base 47) and that the head 212 is biased about the pin means 268 and journal box 266 by the tension spring 294 for counterclockwise pivotal movement. It should be noted at this point that the spring force exerted by the tension spring 294 is much greater than that exerted by the resilient bent tab 196 of the support plate 188 and, thus, any movement of the film strip 26 toward or away from the aperture 190 will be accommodated by a corresponding movement of the support plate 188 with the head 212 restrained against further movement into the aperture 190 by means of arm 288. Any movement of the head 212 out of the aperture 190 will be restrained by virtue of the greater bias effected by the tension spring 294 over that exerted by the resilient end tab 196. Thus, movement of the magnetic recording and playback head 212 from its idle position of FIG. 10 to the operative position of FIG. 5 will cause the film strip 26, which it will be recalled is initially spaced from the support plate 188 as at 210, to engage the raised support strips 200 and 202 and bend the support plate 188 against the bias of the tab 196 to thereby resiliently sandwich the film strip 26 between the transducer 216 and the support plate 188.

Figure 20:
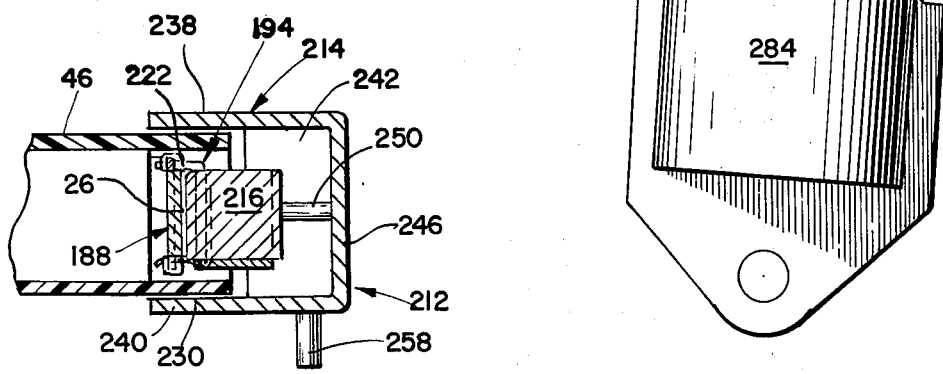
FIG. 20 provides a simplified cross-sectional view taken along lines 20—20 of FIG. 5 illustrating one aspect of the novel shield formed when the magnetic recording and playback head is in its operative position.

As best seen in FIGS. 5 and 20, when the magnetic recording and playback head 212 has partially entered the aperture 190 and the transducer 216 has engaged the sound track on the film strip 26, the laterally spaced faces 238 and 240 of the housing shield 214 will partially extend over the cover and base plates 50 and 47, respectively, of the cassette 1. The faces 242 and 244 of the shield 214 will extend within the aperture 298 to a position proximate the edges of the side walls 46 defining the aperture 190 in the cassette 1.

The support plate 188, which it will be recalled is positioned within the cassette 1 proximate the aperture 190, will be pressing the film strip 26 into abutment with the transducer 216 and thus be closely adjacent the open end of the housing shield 214. In the operative position illustrated in FIGS. 5, and 20, it should be emphasized that the faces 238 and 240 of said shield 214 extend over the cover and base plates 50 and 47, respectively, beyond the general plane of the support plate 188.

Although there will be small gaps between the faces 242 and 244 of the shield 214 and the support plate 188, and although the support plate 188 does not actually directly contact the housing shield 214 (except via the guide shields 218 and 220), the transducer 216 will nevertheless be effectively shielded on six sides against undesired electrostatic and/or electromagnetic interference.

As is well known in the art, it is necessary in recording or transcribing audio signals to or from a magnetic sound track that the sound track be moved at a relatively constant speed. For this purpose, it has been found that a capstan-drive system is more than satisfactory. Accordingly, it should be emphasized that such a drive system is employed when operating the subject invention.

As best seen in FIGS. 5 and 10, the capstan wheel 282, which is mounted on the drive disk 276 (which, in turn, is mounted on the support plate 272), will be caused to pivot with the support plate 272 when the cam follower link 292 is actuated to pivot the support plate 272 counterclockwise and bring the head 212 into its operative position of FIG. 5. The capstan wheel 282 is so positioned that when the plate 272 is pivoted fully counterclockwise, the capstan wheel 282 will abut the film strip 26 and resiliently urge same into engagement with the idler roll 57. In the position of FIG. 5, rotation of the capstan wheel 282 (which it willll be recalled is effected by rotation of the motor shaft 286 and the drive disk 276) will drive the film 26 about the roll 57 and toward the take-up reel 63 in a manner more fully described in copending application Ser. No. 374,578, filed June 28, 1973, aforesaid.

It should again be emphasized that while various components have been illustrated secured within the film drive and projection system 4, the same components can also be secured within the cinematographic camera designed to receive and cooperate with the cassette 1 such that sound recording and playback can take place within the camera rather than within the film drive and projection system as described herein. Further, it should be noted that typically it may be desired to record sound on the sound track after the base of the film strip 26 has been coated with the processing composition 96, as aforesaid, and has been fully wound onto the supply reel 51. At such time, the processing composition 96 may still be wet and it is to be emphasized that the novel configuration of the support plate 188 and cooperating head 212, herein described, will permit the film strip 26 to pass between the head 212 and the support plate 188 without disturbing the processing composition 96. Such movement may be effected because the film strip 26 is supported beneath the edge portions underneath the rails 184 and 186 only, with the support plate 188 configured to define a channel portion 204 between the support strips 200 and 202. Additionally, the ability of the support plate 188 to register with the head 212 and guide the movement of the film strip 26 further enhances the ability for the film strip 26 to pass over the support plate 188 without disturbing the emulsion side of said film strip 26.

It can readily be seen that many variations and modifications of the present invention are possible in the light of the aforementioned teachings and it will be apparent to those skilled in the art that various changes in form and in arrangement of the components may be made to suit requirements without departing from the spirit and scope of the invention. It is, therefore, to be understood that within the scope of the appended claims, the instant invention may be practised in a manner otherwise than is specifically described herein.

What is claimed is:

1. A magnetic recording and playback head mechanism for use with a moving cinematographic film strip, having a magnetic sound track on one face thereof and having a photographic emulsion on the opposite face thereof and adapted to receive a layer of processing composition on said opposite face to process a photographic image and including:
  transducer means movable from an idle position to an operative position in engagement with said sound track;
  means for supporting said film strip in abutment with said transducer means when said transducer means is in said operative position;
  means connected to and partially surrounding said transducer means and adapted to cooperate with said supporting means for establishing an electromagnetic and electrostatic shield about said transducer means and a portion of said sound track proximate said transducer means;
  said means partially surrounding said transducer means being proximate said supporting means when said transducer means moves into said operative position;
  said partially surrounding means and said supporting means being fabricated from material having a high magnetic permeability;
  said film strip being disposed within a cassette, and said supporting means being secured within said cassette and adapted to engage said film strip; and
  a housing;
  said cassette being receivable within said housing and said transducer means being connected to and disposed within said housing;
  said transducer means being provided with mounting means for maintaining engagement and a predetermined registration between said transducer means, said sound track, and said supporting means; and
  said means partially surrounding said transducer means being adapted to extend partially over opposite faces of said cassette when said transducer means is in said operative position.

2. The invention as set forth in claim 1, wherein said supporting means is resiliently secured within said cassette and is adapted to resiliently sandwich said film strip with said transducer means when said transducer means is in the operative position.

3. The invention as related in claim 2, wherein said material of high magnetic permeability comprises mumetal.

4. Means for use in transcribing and broadcasting sound in conjunction with a moving film strip having a magnetic sound track on one face thereof and a photographic emulsion and a processing composition on the opposite face thereof, including:
  a base;
  means connected to said base and initially spaced from said film strip for supporting said film strip;
  transducer means movable from an idle position to an operative position in engagement with said sound track;
  and
  means connected to and partially surrounding said transducer means and cooperable with said supporting means for establishing an electromagnetic and electrostatic shield about said transducer means and a portion of said sound track proximate said transducer means;
  said partially surrounding means and said supporting means being fabricated of a material having a high magnetic permeability;
  a cassette;
  said film strip being disposed within said cassette, and said supporting means being secured within said cassette and adapted to engage said film strip upon movement of said transducer means into said operative position;
  said transducer means being provided with mounting means for maintaining engagement and a predetermined registration between said transducer means, said sound track, and said supporting means;
  said cassette being provided with an aperture proximate said support means and said means partially surrounding said transducer means being adapted to cover said aperture and partially extend over said cassette when said transducer means is in said operative position.

5. A film-laden cassette for use in conjunction with a magnetic recording and playback mechanism, disposed within motion picture apparatus, having transducer means movable between an idle position and an operative position in engagement with said film and an electromagnetic and electrostatic shield partially surrounding said transducer means; said cassette including a support mounted therewithin and adapted to engage said shield and sandwich said film with said transducer means so as to form an electromagnetic and electrostatic shield which surrounds said transducer means and a portion of said film proximate said transducer means when said transducer means is in said operative position;
  said supporting means being initially spaced from said film and said film being brought into abutment with said supporting means when said cassette is positioned within said motion picture apparatus and said transducer means is moved into said operative position;
  said partially surrounding shield and said supporting means comprising material of high magnetic permeability;
and
  guiding means connected to said transducer means and adapted to extend over opposite edges of said film to engage said supporting means to thereby establish and maintain registration between said transducer, said sound track, and said supporting means;
  said cassette being provided with means for coating one face of said film with photographic processing composition and said supporting means being provided with spaced raised support portions for engaging opposite edge portions of said film strip on said composition bearing face.

6. Apparatus for use with a cassette having a movable magnetic sound track bearing strip disposed therein and support means therewithin for supporting said strip adjacent an aperture in said cassette, including:
  transducer means movable from an idle position to an operative position in engagement with said sound track thereby sandwiching said strip with said support means;
and
  means connected to and partially surrounding said transducer means and adapted to cooperate with said supporting means for establishing an electromagnetic and electrostatic shield about said transducer means and a portion of said sound track proximate said transducer means;

said means connected to said transducer means cooperating with said supporting means to surround said transducer means and a portion of said strip;

said apparatus comprising motion picture apparatus having said transducer means disposed therein and said strip comprising a cinematographic film strip;

said partially surrounding means being configured to partially extend over opposite sides of said cassette when said transducer means is in said operative position.

7. A magnetic recording and playback head mechanism for use with a moving cinematographic film strip having a magnetic sound track on one face thereof and having a photographic emulsion on the opposite face thereof and adapted to receive a layer of processing composition on said opposite face to process a photographic image and including:

a cassette;

said strip being disposed in said cassette;

transducer means movable from an idle position to an operative position in engagement with said sound track;

means for supporting said film strip in abutment with said transducer means when said transducer means is in said operative position; and means connected to and partially surrounding said transducer means and adapted to cooperate with said supporting means for establishing an electromagnetic and electrostatic shield about said transducer means and a portion of said sound track proximate said transducer means;

said means partially surrounding said transducer means being proximate said supporting means when said transducer means moves into said operative position;

said partially surrounding means and said supporting means being fabricated from material having a high magnetic permeability;

said means partially surrounding said transducer means being adapted to extend partially over opposite faces of said cassette when said transducer means is in said operative position.

8. The invention as set forth in claim 7, wherein said supporting means is resiliently secured within said cassette and is adapted to resiliently sandwich said film strip with said transducer means when said transducer means is in said operative position.

9. The invention as related in claim 8, wherein said material of high magnetic permeability comprises mu-metal.

10. A magnetic recording and playback head mechanism for use with a moving strip having a magnetic sound track one one face thereof, including:

a cassette:

said strip being disposed in said cassette;

transducer means movable from an idle position to an operative position in engagement with said sound track;

first shielding means in said cassette and located on the opposite side of said strip from said transducer means when said transducer means is in said operative position; and second shielding means connected to and partially surrounding said transducer means and adapted to cooperate with said first shielding means for establishing an electromagnetic and electrostatic shield about said transducer means and a portion of said sound track proximate said transducer means;

said second shielding means being proximate said first shielding means when said transducer means moves into said operative position;

said first and second shielding means being fabricated from material having a high magnetic permeability;

said second shielding means extending partially over opposite faces of said cassette when said transducer means is in said operative position.

11. Means for use in transcribing and broadcasting sound in conjunction with a moving strip having a magnetic sound track on one face thereof, including:

a base;

means connected to said base and initially spaced from said film strip for supporting said film strip;

transducer means movable from an idle position to an operative position in engagement with said sound track;

means connected to and partially surrounding said transducer means and cooperable with said supporting means for establishing an electromagnetic and electrostatic shield about said transducer means and a portion of said sound track proximate said transducer means; and said partially surrounding means and said supporting means being fabricated of a material having a high magnetic permeability; and a cassette;

said strip being disposed within said cassette;

said supporting means being secured within said cassette and adapted to engage said film strip upon movement of said transducer means into said operative position;

said transducer means being provided with mounting means for maintaining engagement and a predetermined registration between said transducer means, said sound track, and said supporting means;

said cassette being provided with an aperture proximate said supporting means, and said means partially surrounding said transducer means being adapted to cover said aperture and partially extend over said cassette when said transducer means is in said operative position.

12. Apparatus for use with a cassette having a moving magnetic sound track bearing strip disposed therein and first shielding means therewithin adjacent said strip adjacent an aperture in said cassette, including:

transducer means movable from an idle position to an operative position in engagement with said sound track; and second shielding means connected to and partially surrounding said transducer means and adapted to cooperate with said first shielding means for establishing an electromagnetic and electrostatic shield about said transducer means and a portion of said sound track proximate said transducer means;

said second shielding cooperating with said first shielding means to surround said transducer means and a portion of said strip;

said first and second shielding means being fabricated from material having a high magnetic permeability;

said second shielding means being configured to partially extend over opposite sides of said cassette when said transducer means is in said operative position.

* * * * *